United States Patent [19]

Eick

[11] Patent Number: 5,644,692

[45] Date of Patent: Jul. 1, 1997

[54] INFORMATION DISPLAY APPARATUS AND METHODS

[75] Inventor: Stephen Gregory Eick, Naperville, Ill.

[73] Assignee: Lucent Technologies Inc., Murray Hill, N.J.

[21] Appl. No.: 360,181

[22] Filed: Dec. 20, 1994

Related U.S. Application Data

[63] Continuation of Ser. No. 32,342, Mar. 16, 1993, abandoned, which is a continuation-in-part of Ser. No. 802,912, Dec. 6, 1991.

[51] Int. Cl.$^6$ .................................................. G06F 17/27
[52] U.S. Cl. ............................................ 395/326; 395/173
[58] Field of Search ............................... 395/12, 62, 64, 395/147, 155, 156; 345/140, 152

[56] References Cited

U.S. PATENT DOCUMENTS

| | | | |
|---|---|---|---|
| 4,752,889 | 6/1988 | Rappaport et al. | 395/12 |
| 4,845,653 | 7/1989 | Conrad et al. | 395/155 X |
| 4,860,204 | 8/1989 | Gendron et al. | 395/12 X |
| 4,896,291 | 1/1990 | Gest et al. | 395/156 X |
| 4,937,743 | 6/1990 | Rossman et al. | 395/155 X |
| 4,958,301 | 9/1990 | Kobayashi | 395/147 X |
| 5,043,920 | 8/1991 | Malm et al. | 395/131 X |
| 5,136,690 | 8/1992 | Becker et al. | 395/161 |
| 5,191,646 | 3/1993 | Naito et al. | 395/161 |
| 5,195,178 | 3/1993 | Krieger et al. | 395/156 X |
| 5,214,757 | 5/1993 | Mauney et al. | 395/161 |
| 5,278,951 | 1/1994 | Camacho et al. | 395/155 X |
| 5,289,572 | 2/1994 | Yano et al. | 395/155 |
| 5,297,248 | 3/1994 | Clark | 395/155 |
| 5,321,803 | 6/1994 | Ditter, Jr., | 395/155 X |
| 5,323,314 | 6/1994 | Baber et al. | 395/155 X |
| 5,334,992 | 8/1994 | Rochat et al. | 345/22 |
| 5,339,392 | 8/1994 | Risberg et al. | 395/161 |

FOREIGN PATENT DOCUMENTS 2137788  10/1984  United Kingdom .

OTHER PUBLICATIONS

Microsoft Windows 3.0 User Manual, 1990 pp. 17–22, 47–55, 147–153, 399–403, 516–517.
Show, Borland ctt 2.0 provides a comprehesive windows development environment, Microsoft Systems Journal May 1991 p. 45.
Borland, Quattro Pro User's Guide, 1989, pp. 184–185, 235–237, 248–249.
"Learning Data Analysis with Data Desk", by P. F. Velleman, Working with Displays, pp. 101–114, 1989.
"Data Desk, The New Power of Statistical Vision", P. F. Velleman, Quickstart Guide, pp. 1–42, 1992.

*Primary Examiner*—Mark K. Zimmerman
*Assistant Examiner*—Anton W. Fetting

[57] ABSTRACT

Apparatus for displaying information about a very large number of entities. The apparatus includes very small entity representations which represent the entities. The entity representations are contained in columns which represent contexts for the entities. In one embodiment of the apparatus, the entities are lines of text and the contexts are files containing the lines. Also included is a selector with a set of colored fields corresponding to values of attributes of the entities. When either an entity representation or a selector field is activated by means of a pointing device, the selector field and all of the entity representations for entities having the attribute value corresponding to the selector field are turned on and appear in the same color. The pointing device may also be used to specify an entity representation for detailed viewing. In response to this operation, a code viewer opens which displays detailed information about the entity corresponding to the specified entity representation. The apparatus may display values from different attribute types and may turn on an entity representation in response to a set of attribute values having different types. There are further animated display modes and techniques for remapping colors onto the selector fields. Applications of the apparatus include testing and maintenance of software and selection of programs in interactive TV systems.

56 Claims, 14 Drawing Sheets

LINE-ATTRIBUTE
VALUE MAP 703

ATTRIBUTE
VALUE LIST 1709

ATTRIBUTE
STATUS LIST 1719

ATTR DESC LIST 715

ATTRIBUTE
COLOR LIST 1723

SECTION WIDTH LIST 1727

ATTRIBUTE OBJECT 1701($_i$)

INFORMATION DISPLAY APPARATUS AND METHODS

CROSS-REFERENCE TO RELATED APPLICATION

This application is a continuation of application Ser. No. 08/032,342, filed on Mar. 16, 1993, now abandoned, which is a continuation-in-part of U.S. Ser. No. 07/802,912, filed Dec. 6, 1991. The parent application has the same rifle, inventor, and assignee as the present application. The present application contains the complete Detailed Description and Figures from the parent. FIGS. 16-22 have been added to the present application. New material in the Detailed Description includes the section titled "Key Properties of the Information Display Apparatus" at the beginning of the Detailed Description and the material at the end of the Detailed Description beginning with the section titled "Improvements in the Information Display Apparatus."

BACKGROUND OF THE INVENTION

1. Field of the Invention

The invention concerns the display of information in a digital computer system and more particularly concerns the display and analysis of information about a very large number of entities.

2. Description of the Prior Art

Users of computer systems have access to enormous quantities of primary information. For example, it is easy for the user to display any line of any text file which the user is permitted to read. The computer has also made it possible to compute or gain access to all kinds of secondary information, that is, information about the primary information, for example, it is easy to determine how many times a given word appears in a collection of text files and where the occurrences are in the text files. If the information is available in the computer system, it also easy to determine things like who wrote each line in the text file or when the line was written.

A consequence of the easy availability of large amounts of primary and secondary information has been the development of many kinds of information analysis systems. These systems use the secondary information to select items of the primary information, and thereby permit study of the primary information. An example of such an information analysis system is the text data base, which permits a user to search for information in a collection of text files.

A problem in the use of such information analysis systems has been the manner in which the information in the information analysis system is displayed. Typically, the user can display the secondary information which he is using to access the primary information and can display the actual primary information. The display generally provides little or no information about the relationship between the secondary information and the primary information. For example, the user of a text data base can see the expression he is using to search the text data base, can see how many "hits" there were, i.e., how many items in the text data base contained words which satisfied the search expression, and can see a screenful of lines from any of the items upon which there was a hit. What the user does not have is an overview of the relationship between the hits and the items in which they occur or the relationship between the hits and the entire text data base.

In broad terms, the prior-art displays do not provide a context for the evaluation of the hits. Such a lack of context is particularly important in situations where the context is known to the user and is important for the evaluation of the primary information. For example, in a text data base, the occurrence of hits in certain texts may have more significance than their occurrence in others, and even the locations in the texts at which the hits occur may be important.

The information display apparatus of the parent application solved the above problem by displaying information about a very large number of entities in a fashion which preserved the context of the entities, permitted the discovery of interesting subsets of the entities, and permitted detailed study of the entities. The present patent application discloses improvements which substantially increase the usefulness of the information display apparatus.

SUMMARY OF THE INVENTION

The information display apparatus of the parent application worked by relating entity representations to values of attributes of the entities and permitting the user to select among attribute values. Selection was done using a selector in the display which had sections representing the attribute values. When an attribute value was selected, the color of the entities having the attribute value changed to a color which corresponded to the attribute value. This technique permitted the user to easily see which subsets of the entity representations were related to various attribute values.

In the original information display apparatus, the user could manipulate values of only one attribute type; in the improved version, the user can manipulate values of a number of attribute types. The attribute type whose values are currently represented by the selector is termed the foreground attribute type. Values of the other attribute types may, however, be used in conditional display. In this mode, one or more of the other attribute types is selected as a background attribute type. Whether an entity representation for an entity is displayed depends not only on whether its value has been selected in the foreground attribute type, but also on whether its value has been selected in the background attribute types. The technique permits the user to experiment with questions whose answers depend on more than one attribute value. For example, if the entities are lines of code and the attribute types include the programmer names and the times of modification, conditional display permits display of entity representations for only those lines of code which were written by Smith in February, 1993.

Other important improvements concern the selector. The improvements include automation, proportional display, and remapping of colors. In automation, the values in the selector may be automatically activated in sequence, so that the user can see what patterns emerge during automatic activation. In proportional display, the sections of the selector which represent values fill their parts of the sector in proportion to their relationships to others of those values. In color remapping, the user can select a subset of the values in the selector and map that subset onto the entire color spectrum.

New applications include using the improved display apparatus to display results of tests of code, using the apparatus to analyze error log files, and using the apparatus in an interactive television system. When used to display the results of the tests of code, the display apparatus can show test coverage, code "hot spots", or both. Analysis of error log files takes advantage of the ability of the apparatus to provide a context, in this case, the times at which the messages in the error log were created and of the ability of the apparatus to show the shapes of the entities it represents.

When used in an interactive television system, the apparatus helps the user to select what he wants to see from the plethora of offerings available to him.

The foregoing and other aspects and objects of the techniques and apparatus disclosed herein will be apparent to those of ordinary skill in the art after perusal of the following Drawing and Detailed Description, wherein:

Figure 1:
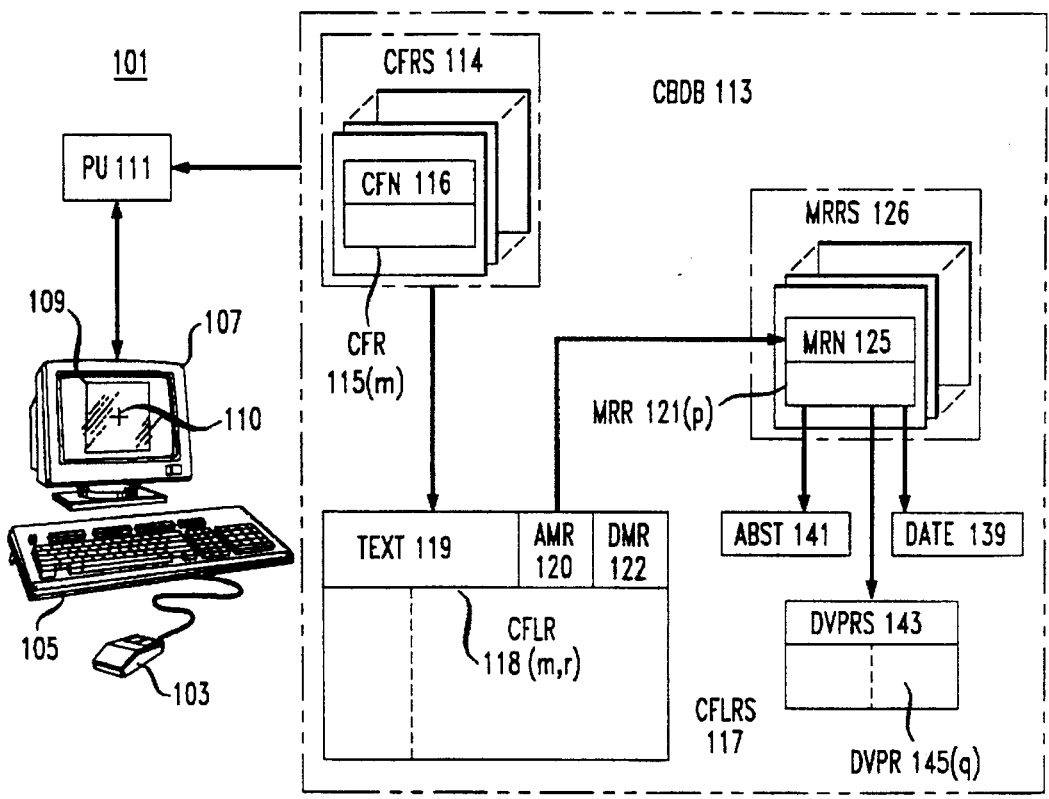
FIG. 1 is a diagram of a system in which a preferred embodiment is employed.

Reference numbers employed in the Drawing and the Detailed Description have two parts. The two least significant digits specify the number of an item in a figure; the remaining digits specify the figure in which the item first appears; thus, an item with the reference number 603 is first shown in FIG. 6.

DETAILED DESCRIPTION

Introduction to the Detailed Description

In the time since the parent of the present patent application was filed, experience with and further development of the information display apparatus has led both to a better understanding of the essential nature of the apparatus and to a number of improvements. The following Detailed Description will begin with a general discussion of the advantages and uses of the information display apparatus, will then incorporate the Detailed Description from the parent patent application, and will finally describe the improvements.

Figure 16:
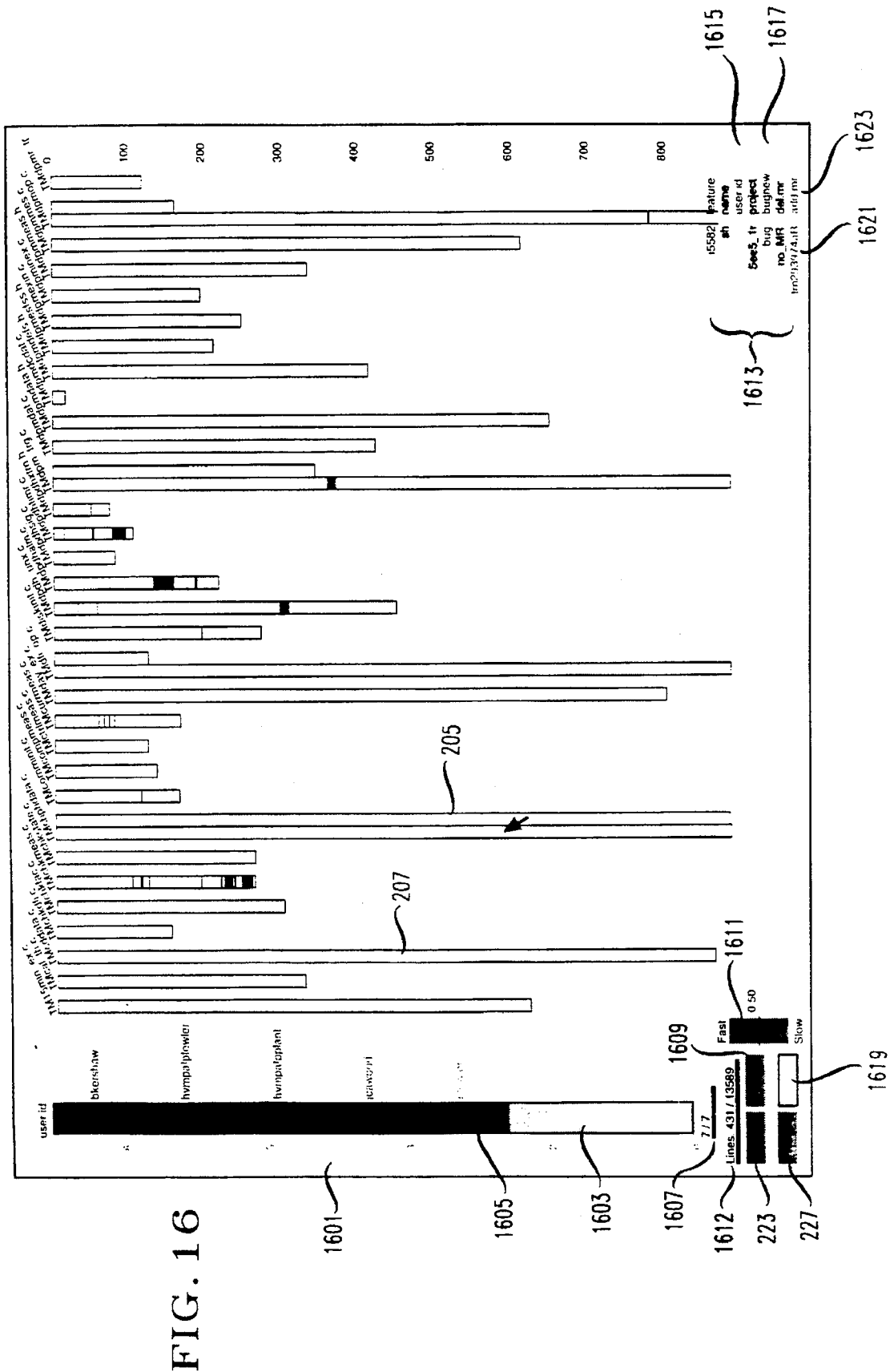
FIG. 16 is a diagram of a display produced by the improved information display apparatus.

Key Properties of the Information Display Apparatus: FIG. 16

Much of the value of the information display apparatus lies in two properties:

- that it is able to usefully display information about a very large number of individual entities simultaneously and
- that it permits the user to easily find and investigate interesting subsets of the entities.

The first property is the result of a number of features of the invention. The features may be seen in FIG. 16, which shows a display 1601 produced by the improved display apparatus. FIG. 16 shows how attribute values relate to a collection of files containing source code. To begin with, there is a distinguishable visual representation in display 1601 corresponding to each entity about which the information is being provided. These distinguishable visual representations appear in FIG. 16 as line representations 207. Each line representation 207 represents one line of the source code. Second, these entity representations appear in a representation of a context to which the line representations belong. In FIG. 16, the vertical bars 205 indicate the files which contain the source code. There is a vertical bar for each file, and there is a line representation 207 in the vertical bar 205 representing a file for each line in the file. The line representations further have the same order as the lines in the file. It is thus it is always clear in display 1601 from the display what file a line corresponding to a line representation 207 belongs to and what its position in the file is. Further, if there is a natural order to the files (for example, if it makes sense to order the files by time), then the columns representing the files can be given that order in display 1601.

Another of the features which contributes to the first property is the entity representation itself. It is necessarily very small (the minimum size of line representation 207 in FIG. 1601 is 1 by 15 pixels), but is nevertheless able to convey a large amount of information about the entity. The color of the entity representation indicates the value of an attribute belonging to the entity, the shape of the entity representation indicates something about the shape of the entity, and display techniques such as blinking may carry further information. In FIG. 1601, the color of line representation 207 shows who wrote the line. Shape is not used in FIG. 1601, but may be used to show how the lines of code are indented. Blinking, finally, may be used to show how values of other attributes affect the line represented by the blinking line representation 207.

A further feature which contributes to the first property is a set of browsers which permit the user to select entities for detailed viewing. Selection is by moving a target for the browser over an entity representation. The corresponding entities then appear in a browser window. The browsers are termed "code viewers" in the parent application and may be seen in FIG. 501.

The second property, permitting the user to easily find interesting subsets, is in large measure the result of the relationship between the entity representations and a component of the display called the selector. In FIG. 16, the selector has the reference number 1603. In the parent application, the selector was termed the line characterization column. The selector 1603 contains a section 1605 for each value of the attribute. When active, the section 1605 has the same color as the line representations 207 for the lines which have that attribute value. Linkage between the selector and the entity representations makes it easy to display subsets of the entity representations. A section 1605 of selector 1603 may be activated by selecting it with the mouse, and when it is activated, all of the entity representations which have the section's value and the section itself are displayed in the value's color. Correspondingly, when an entity representation is activated in the same manner, the section in the selector for the attribute's value is activated and all of the other entity representations having that value are also activated.

The fact that the display apparatus displays representations of large numbers of entities in a fashion that preserves context and provides considerable information about the entity and the fact that the display apparatus permits easy subsetting of the entities makes the display apparatus particularly useful in situations where there are a large number of entities and the entities either have or can be given an organization which can be expressed spatially. One such situation is that presented by a body of text: as indicated above, the display apparatus permits display of information about a great many lines of text while preserving the context of the lines. Other such situations would be presented by lists of records.

As will be seen in the following, the improvements to the display apparatus which are disclosed in the present patent application increase the ability of the user to discover and investigate interesting subsets and thereby increase the usefulness of the display apparatus.

Environment of the Invention: FIG. 1

A preferred embodiment of the invention is employed by developers in charge of maintaining a very large body of code for a digital switch. A major problem in maintaining any large body of code is keeping track of the changes. The developers who use the preferred embodiment make changes in the code for the digital switch only in response to modification requests, or MRs. In environment 101 in which the preferred embodiment is employed, all of the changes resulting from the MRs are recorded in code body data base 113. In data base 113, there is a code file record (CFR) 115 for each file of code used in the switch. Together, these records 115 make up code file records (CFRS) 114. A given code file record 115(m) includes code file name (CFN) 116, which is the name of the code file to which the record corresponds, and a pointer to a set of code file line records 117. Set of records 117 includes a code file line record (CFLR) 118 for every line of code which has been added to or deleted from the code file corresponding to code file record 115(m). A code file line record 118(m,r) for line r of the file represented by code file record 115(m) contains three fields:

•Text field 119 contains the text of the added or deleted line;
•Add MR (AMR) 120 and delete MR (DMR) 122 are pointers to records in code body data base 113 for the MRs which resulted in the addition of the line to or deletion of the line from the file. Since every line was at one time added to the body of code, every line has a pointer in AMR field 120; if the line was subsequently deleted, there is also a pointer in DMR field 122; otherwise, DMR field 122 has a null pointer value.

In CFLR 118(m,r), add MR field 120 contains a pointer and DMR field 122 contains a null value. Hence, there is a single modification request record (MRR) 121 corresponding to the code file line represented by code file line record 118(m,r).

There is a modification request record 121 for every modification request which has resulted in a change in the body of code. All of the modification request records 121 together make up modification request records (MRRS) 126. Each modification request record 121 contains modification request name (MRN) 125 and pointers to other items of information. Those relevant to the present discussion include date 139, which is the date at which the modifications requested in the modification request were completed, abstract 141, which is a short description of the modification request, and developer records (DVPRS) 143 which contains developer records (DVPR) 145 for the developers who carried out the modification request.

As is apparent from FIG. 1, every code file line record 118 which was modified by a given modification request will contain a pointer to the modification request record 121 for the given modification request. A developer may thus employ code body data base 113 to determine when, why, and by whom every line in the body of code was added or deleted. All of the information in code body data base 113 is accessible by means of processing unit 111, which can use a data base system to retrieve information from code body data base 113. The retrieved information can be displayed on display 107 in response to commands input via keyboard 105 or pointing device (in this case, a mouse) 103. A current position in display 107 is indicated by cursor 110, which may be controlled either from keyboard 105 or mouse 103. If a windowing system is executing on processor 111, the information may be displayed in one or more windows 109 in display 107. For example, a programmer might employ one window 109 to display lines of code from the text fields 119 of the code file line records 118 for the relevant lines and another window to display information from modification request records 121 for the relevant lines.

While code body data base 113 contains all of the information which a programmer seeking to understand the history of the body of code needs, the usefulness of the information is severely limited by the fact that very little of it is visible at a given moment. Display device 107 has a display which generally measures no more than 19 inches diagonally, and information from code body data base 113 is generally displayed in the form of ASCII characters; consequently, no more than about 200 total lines of information from code body data base 113 can be usably displayed in display device 107.

Using the Preferred Embodiment to Display Information: FIGS. 2–6

Figure 2:
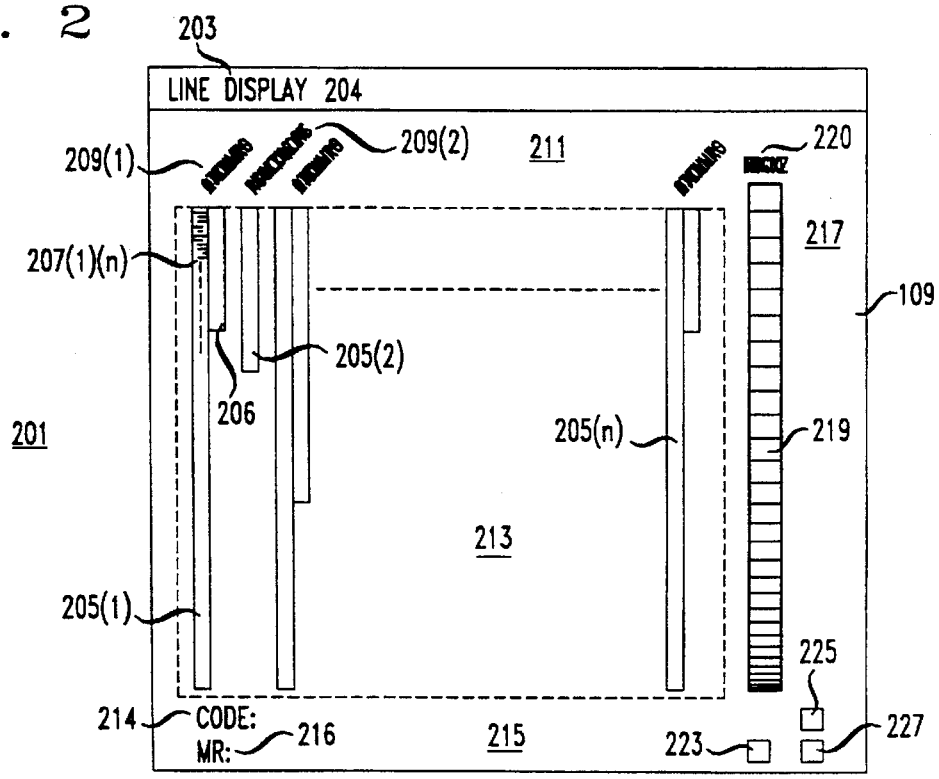
FIG. 2 is a diagram of a display produced by the preferred embodiment.

FIG. 2 shows how the preferred embodiment is employed to display information from code body data base 113. Display 201 is in a window 109 of display 107. As indicated by title 203 at the top of display 201, the display's purpose is to display information about lines of code from the code files making up the body of code. Display 201 is divided into five parts:

•Title display part 204 displays the window's title;
•display space part 213 displays file columns 205 which represent code files 116 and which contain line representations 207 representing lines in the code file 116 represented by the file column 205;
•top space part 211 contains the name of the code file represented by each file column 205;
•right hand space part 217 displays line characterization column 219; and
•bottom space part 215 displays textual information about a selected line of code or a selected modification request and three buttons for controlling the preferred embodiment.

Beginning with details of display space 213, there is a column 205 for each code file in the body of code. The name 209 of the code file to which column 205 corresponds appears in top space 211 above that column 205. The name is of course taken from code file name 116 of code file record 115 corresponding to the code file. Each column 205 is automatically sized so that columns 205 for all of the code files in the body of code fit in display space 213. The minimum width of a column is 15 pixels, and the column is as long as is required to contain a line representation 207 for each code line for which a line representation is being displayed. If the number of lines in the code file results in a column 205 which is longer than display space 213, an additional column 206 for the remaining lines is placed immediately adjacent to column 205.

The developer can employ button 227 to select code lines for display. In the preferred embodiment there are three options:
- a lines added option, in which the line representations 207 in the columns 206 represent code lines which have been added to the files represented by columns 206 and have not been deleted;
- a lines deleted option, in which the line representations 207 in the columns 206 represent code lines which have been deleted from the files represented by columns 206; and
- a split column option, in which two sets of line representations are displayed side by side in the columns 206, one representing code lines which have deleted and the other representing code lines which have been added.

Whether a code line has been added or deleted can of course be determined from code body data base 113. The line representations 207 appear in the same order in column 205 as the lines appear in the code file. In the preferred embodiment, line representations 207 are a single pixel thick. As will be discussed in more detail below, the color of line representations 207 can be changed by operations on display 201.

In the preferred embodiment, the code is written using standard indentation rules, and consequently, indentations of code lines carry information about the structure of the code. To make this information available to programmers looking at display 201, the preferred embodiment provides a button 223 which selects whether a line representation 207 is to show the indentation of the corresponding code line. The programmer uses his mouse 103 to activate the button and thereby select indentation. If indentation has been selected, the pixels of line representation 207 begin at a distance from the right-hand side of column 205 which corresponds to the degree of indentation of the corresponding code line and the line representation contains a number of pixels which corresponds to the length of the corresponding code line. If indentation has not been selected, line representation 207 fills the entire width of column 205.

Bottom space 215 contains buttons 223, 225, and 227 and labels 214 and 216; the use of button 223 and button 227 have already been discussed, and the use of button 225 will be described in detail later. Label 214 indicates the where the preferred embodiment displays the text of a selected line of code and label 216 indicates the position at which the text of the abstract of a selected modification request is displayed. The manner in which the selection occurs will be described later.

Right hand space 217 contains line characterization column 219 and line characterization column label 220. Line characterization column 219 indicates how different values from modification request records 121 are to be displayed in line representations 207. For example, each code file line record 119 includes a pointer to the modification request record 121 for the modification request which added or deleted the line, and the relevant modification request record 121 in turn includes a pointer to date record 139; consequently, the time at which every line of code was added to or deleted from the code body can be determined from code body data base 113. The time at which a line of code was changed is made visible in display 201 as follows: a shade of color is assigned to each modification request. The shade depends on when the modification request was completed. In the preferred embodiment, the shades range from red through yellow to blue, with blue representing the oldest and red the most recent modification request. Further, each modification request is associated with a modification request representation consisting of a rectangle of pixels in line characterization column 219, with the rectangle for the oldest modification request at the bottom and the rectangle for the youngest at the top. The modification request representation for a given modification request is further displayed in that modification request's color, so that the color of line characterization column 219 ranges from blue at the bottom to red at the top. Finally, the line representations 207 which were added or deleted in a given modification request are displayed in the color corresponding to that time. Thus, line representations 207 which were added or deleted in the most recent modification request are red, while those which were added or deleted in the oldest modification request are blue, and the other line representations 207 have the colors corresponding to the modification requests in which they were added or deleted.

Display 201 is thus noteworthy for two reasons: first, it displays representations 207 of all of the lines in the code body at once. Second, it displays information about the displayed lines. As regards the display of representations of all of the lines in the code body, a standard display 107 with a 19 inch diagonal measurement can display 1024 pixels vertically and 1280 pixels horizontally. If display 201 is in a window 109 which occupies substantially all of display 107, line characterization column 219 takes up about one fifth of the horizontal space and top space 211 and bottom space 215 about one eighth of the vertical space, leaving a display space 213 of about 900 pixels by 1000 pixels for display of columns 205. With a minimum column width of 15 pixels and a distance of 8 pixels between columns, more than 40 columns 205 can be displayed, and each of these columns can have up to 900 line representations. Thus, a single display space 213 in a preferred embodiment can display line representations 207 for more than 36,000 individual lines of code.

As regards the display of information about the lines, in the example set forth above, display 201 provides the developer with a complete overview of the temporal development of the code body. Line representations 207 which have the same or closely-related shades represent code lines which were modified at approximately the same time. The developer can thus see the major stages of development of the code body from the colors which appear in the line representations 207 in the columns 205. Further, the developer can determine whether a portion of the body of code has remained stable over time or whether it has been constantly reworked. In the first case, most of the line representations 207 will have the same color; in the second, they will have many different colors. Finally, the developer can easily see how changes made in one code file relate to changes made in other code files, and can thereby see dependencies between code files.

Figure 3:
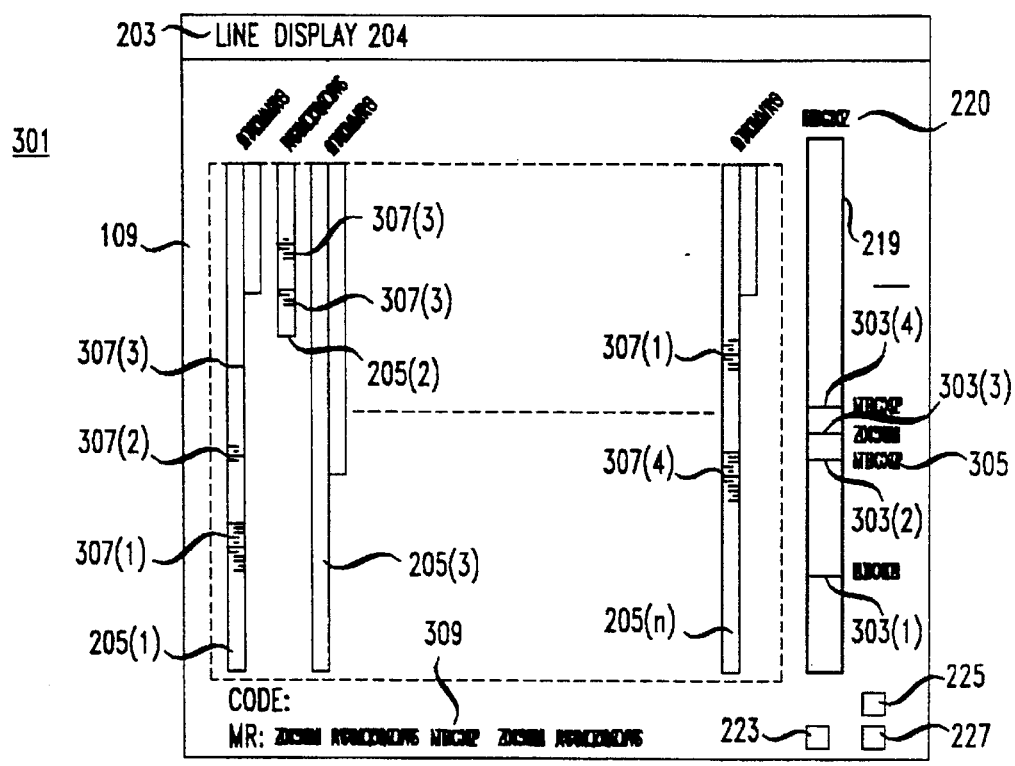
FIG. 3 is a diagram of a second display produced by the preferred embodiment.
Figure 4:
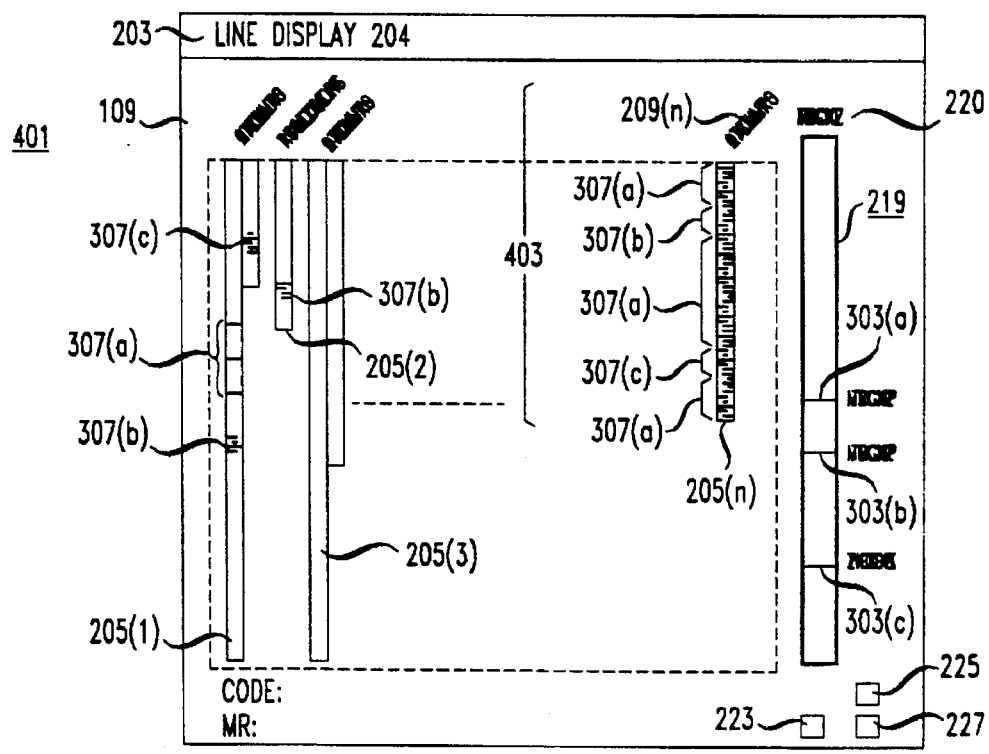
FIG. 4 is a diagram of a third display produced by the preferred embodiment.
Figure 5:
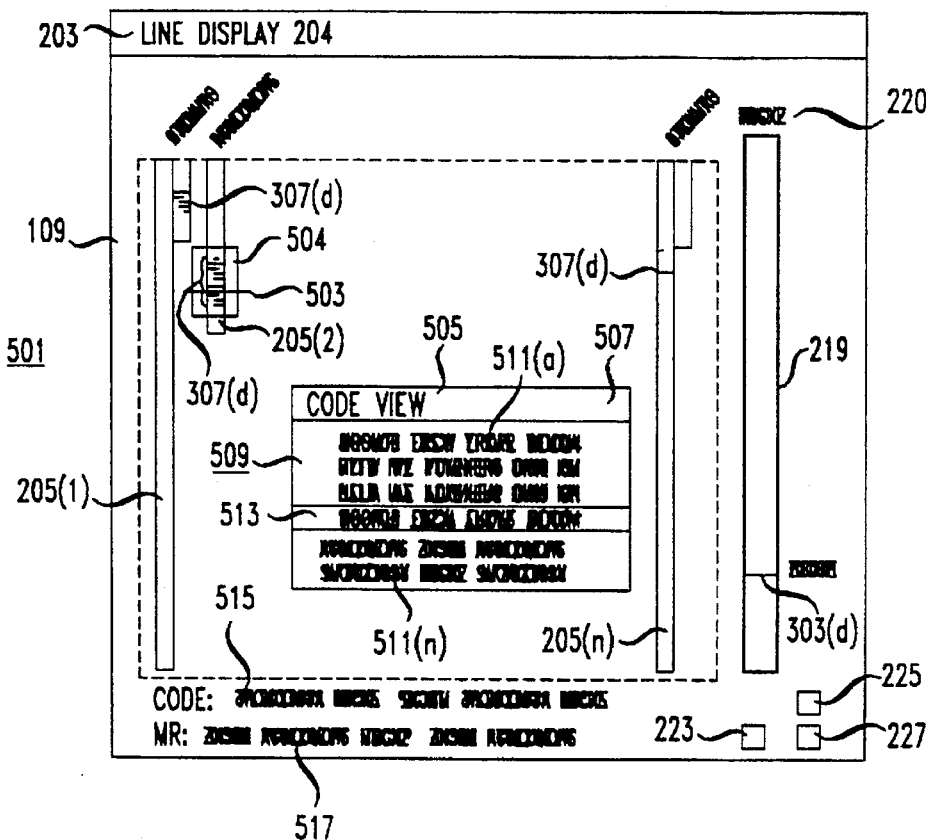
FIG. 5 is a diagram of fourth and fifth displays produced by the preferred embodiment.

Operations on Display 201: FIGS. 3-5

Display 201 shows how a preferred embodiment presents an overall view of information from code body data base 113 about the code body. Using mouse 103, a user of the preferred embodiment may perform operations on display 201 to obtain more detailed information about the code body.

There are four general classes of mouse operations which may be performed on display 201: moving the cursor, selecting an entity at the current location of the cursor, deselecting the entity at the current location of the cursor, and moving a window. To move the cursor, the developer simply moves mouse 103. If no buttons are being pressed, when cursor 110 passes over a line representation 207 or a modification request representation which is turned off (has the color black in a preferred embodiment), the line representation 207 or the modification request representation is turned on (is given the color associated with the relevant modification request) while the cursor 110 is over the line representation or modification request representation. The modification request representation for a given modification request and the line representations 207 for the code lines modified in the given modification request are coupled together so that if the cursor 110 is on the given modification request or on any line representation 207 for any line of code affected by the given modification request, the modification request representation for the given modification request and all of the line representations for the lines affected by the given modification request are turned on.

If the leftmost mouse button being pushed, the line representation or modification request representation under the cursor is turned on and left on after the cursor moves on; the modification request representation and the line representations 207 for the affected lines are coupled as previously described. If the middle mouse button is being pushed, the line representation or modification request representation under the cursor is turned off and left off after the cursor moves; again, the modification request and its corresponding line representations are coupled. If both the left-hand and middle buttons are pushed, the mouse 103 can be used to move components of display 201 about. The use of the right-hand mouse button will be discussed further on.

All of the line representations 207 and modification request representations can be turned on or off by means of label 220 for line characterization column 219. If mouse 103 is moved to label 220 and the leftmost button is pushed, all of the line representations 207 and modification request representations are turned on and left on; if the middle button is pushed, all of the line representations 207 and modification request representations are turned off and left off until the cursor passes over the line representation or modification request representation. In the following, a modification request is described as being active if its modification request and the line representations 207 coupled with the modification request are turned on and left on.

FIG. 3 shows how a developer may employ mouse 103 to obtain more information about one or more modification requests. Display 301 results when all of the line representations 207 and modification request representations have been turned off as just described. As mouse 103 moves cursor 110 across the window, the line representations 207 and their coupled modification request representations over which the cursor passes are turned on; if the leftmost button is depressed at that point, the modification request corresponding to the modification request representation has been activated and the modification request representation and its coupled line representations 207 stay on. Thus, FIG. 3 shows the result after the developer has depressed the leftmost mouse button over modification request representation 303

(1), 303(2), 303(3), and 303(4). The line representations 207 coupled with those modification request representations appear respectively as sets of line representations 307(1), 307(2), 307(3), and 307(4) respectively. When a modification request representation 303 is activated as just described, a label 305 appears to the right of the modification request representation 303. The text of label 305 comes from name record 125 of the modification request record 121 for the modification request. Further, the text 309 of the abstract of the modification request appears following label 216 in bottom field 215. The text comes of course from abstract record 141.

A developer may deactivate a modification request in the preferred embodiment by placing the cursor over modification request representation 303 corresponding to the modification request and pressing the middle button. When the button is pressed, modification request representation 303 is and its coupled line representations are turned off, as are label 305 and abstract text 309. Labels 305 and abstract text 309 do not appear when all modification requests are activated by using mouse 103 to select line characterization column label 220.

Another operation on display 201 is the code file selection operation shown in FIG. 4. Again, code file selection operations are generally performed after columns 205 and line characterization column 219 have been turned off. In the code file selection operation, a code file 115 is selected by using mouse 103 to select column label 209 for column 205 representing the code file 115. In FIG. 4, the selected code file 403 is taken to be that represented by column 205($n$). When column label 209 is selected, all of the modification requests which affected the given file are activated. Consequently, the line representations 207 in column 205 ($n$), all of the modification requests 303 coupled to those line representations, and all of the line representations 207 coupled to the modification requests 303 are turned on. Again, labels 305 and text 309 do not appear.

in FIG. 4, the file represented by file column 205($n$) is the result of three modification requests, and thus three modification request representations, 303($a$), 303($b$) and 303($c$). The code lines 207 which were modified in the three modification requests appear in columns 205($n$), 205(1), and 205(2) as lines 307($a$), 307($b$), and 307($c$) respectively. Since a file generally includes many lines and is the result of at least several modification requests, the file selection operation does not display text following code label 214 and MR label 216 or labels 305 for MR representations 303. Deselection of column label 209 for a selected column 403 turns off the display of the line representations 307 ($a$), ($b$), and ($c$) in all of the columns 205 and the display of the modification request representations 303 ($a$), ($b$), and ($c$) in line characterization column 219. As can be seen from the foregoing, the file selection operation permits the user to instantly see what modification requests have affected the selected file and how these modification requests have affected the other files of the code body 114.

Another operation possible on display 201 is line selection. When cursor 110 is moved onto a given line representation 207 and the line representation is selected by pressing the leftmost mouse button, the pixels in line representation 207 remain turned on when cursor 110 moves on. Of course the coupled modification request representation 303 and the line representations 207 coupled to that modification request representation 303 also remain turned on and label 305 appears with the modification request representation 303. Thus, in FIG. 5, display 501 shows selected line representation 503, which was modified in the modification request corresponding to modification request representation 303 (*d*). Line representation 503 is part of one of the sets of line representations 307(*d*) which were modified in the modification request corresponding to modification request representation 303(*d*), and the pixels in those line representations are also turned on. The selected line itself appears following the label "Code" in bottom space 215, and the abstract for the modification request corresponding to modification request representation 303(*d*) appears following the label "MR" in bottom space 215. In FIG. 5, the line of code has the reference number 515, and the abstract has the reference number 517. As may be inferred from the foregoing discussions, the general principal for the appearance of an abstract at 517 and a line of code at 515 is that the current operation on display 201 only specify a single modification request and/or a single line of code. Line deselection is done by moving the cursor across a line representation 207 while the middle button is depressed, and the result is the reverse of the result of line selection.

FIG. 5 also illustrates code view window 505. Code view window 505 displays lines of code preceding and following the line of code represented by line representation 207 at which cursor 110 is presently located. To open code view window 505, the developer using the preferred embodiment employs mouse 103 to select code window button 227. The window then opens, and the developer can use mouse 103 to size the window or change its location. After the developer has opened and sized code view window 505, he may move cursor 110 to a column 205; at that point, a rectangle 504 appears at the position of the cursor in column 205. The rectangle has a horizontal line across its center and has a size which is proportional to that of window 505, i.e., rectangle 504 has space for as many line representations 207 as window 109 has for lines of code. As long as cursor 110 is in a column 205, cursor 110 is at the center of rectangle 504 and rectangle 504 moves with cursor 110. The code lines corresponding to any line representations 207 which are within rectangle 504 appear in window 505.

Rectangle 504 may be detached from cursor 110 by pushing the rightmost button of mouse 103. When that is done, rectangle 504 remains where it was when the rightmost button was pushed and window 505 continues to display the lines of code corresponding to the line representations contained within rectangle 504. Rectangle 504 may be reattached to cursor 110 by again pushing the rightmost button, at which point rectangle 504 moves to where cursor 110 is. Code window 505 is closed by using the standard closing operation for the windowing system.

If columns 205 are split, i.e., display line representations 207 for both added and deleted lines, window 505 is also split, with the added and deleted lines of code being displayed alongside each other. The colors of displayed lines of code 511 are the same as those of the corresponding line representations 207 within rectangle 504. If the corresponding line representation 207 is not turned on, the displayed line is gray. At the center of code display space 509 is displayed line of code 513, which is the line of code corresponding to the line representation 207 at the location of the horizontal line in rectangle 504. In a preferred embodiment, displayed line of code 513 has a different colored background from lines 511. As would be expected, line of code 515 is the same as line 513 and abstract 517 is that for the modification request corresponding to displayed line of code 513. In a preferred embodiment, the code lines visible in code window 505 can be changed only by moving rectangle 504; in other embodiments, the code lines may be moved by scrolling up or down within window 505 and rectangle 504 may move in column 205 as lines are scrolled within window 505.

Figure 6:
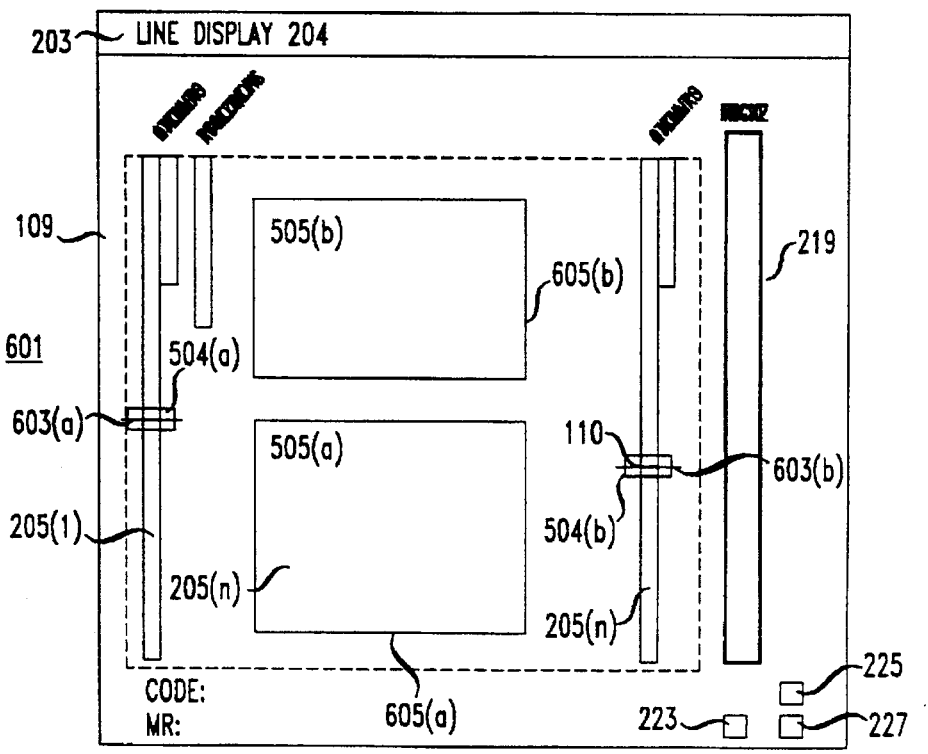
FIG. 6 is a diagram of a sixth display produced by the preferred embodiment.

In a preferred embodiment, there may be up to three code windows 505. By using multiple code windows 505, a developer can compare the code in one portion of the code body with the code in another portion of the code body. FIG. 6 shows a display 201 with two code windows 505(*a*) and 505(*b*). Presuming that code window 505(*a*) already exists and that rectangle 504(*a*) has been detached from cursor 103, a new code window 505(*b*) is made by moving cursor 110 to code window button 227 and selecting the button. As a result, window 505(*b*) is opened and rectangle 504(*b*) appears and is attached to cursor 110. Window 505(*b*) can be moved and sized as previously described, and since rectangle 504(*b*) is now attached to cursor 110, movements of cursor 110 are reflected in window 505(*b*).

Rectangle 504(*b*) can of course be detached from cursor 110 as described above. If there is more than one rectangle 504 in display 201 and cursor 110 is attached to none of them, depressing the rightmost button of mouse 103 causes cursor 110 to move to the closest rectangle 504 and causes that rectangle 504 to attach itself to cursor 110. In the preferred embodiment, the border 603 of a rectangle 504 has the same color as the border 605 of the window 505 to which the cursor corresponds, making it easy for the developer to determine which rectangle 504 corresponds to which window 505. As will be apparent to those skilled in the graphic display arts, the techniques which have been just described with regard to code windows 505 and rectangles 504 may be employed in any situation in which a "zoom" window is used to show details about a portion of a display.

The operations on display 201 thus permit a developer to easily and quickly determine what lines of code in the body of code were affected by one or more modification requests, to determine which modification requests are relevant to a given file of code or to a given line in a given file of code, and to display a given line of code and the lines of code in the given line's immediate environment. All of these operations are of course made more useful by the fact that they are performed in the context of the overview of the entire body of code which is provided by display 201. Other aspects of display 201 which are not shown in FIGS. 2–6 but are worthy of mention are the following: in some embodiments, there is a line number scale along the left-hand side of display space 214 and a scale along the left-hand side of line characterization column 219 which indicates degrees of the values associated with the shades of color in line characterization column 219. For instance, in display 201, the shades are associated with dates, and the scale is a date scale.

Implementation of a Preferred Embodiment: FIGS. 7–13

The following discussion of an implementation of a preferred embodiment first describes the hardware in which the invention is implemented, then describes the data structures, and finally describes operation of the preferred embodiment.

Figure 7:
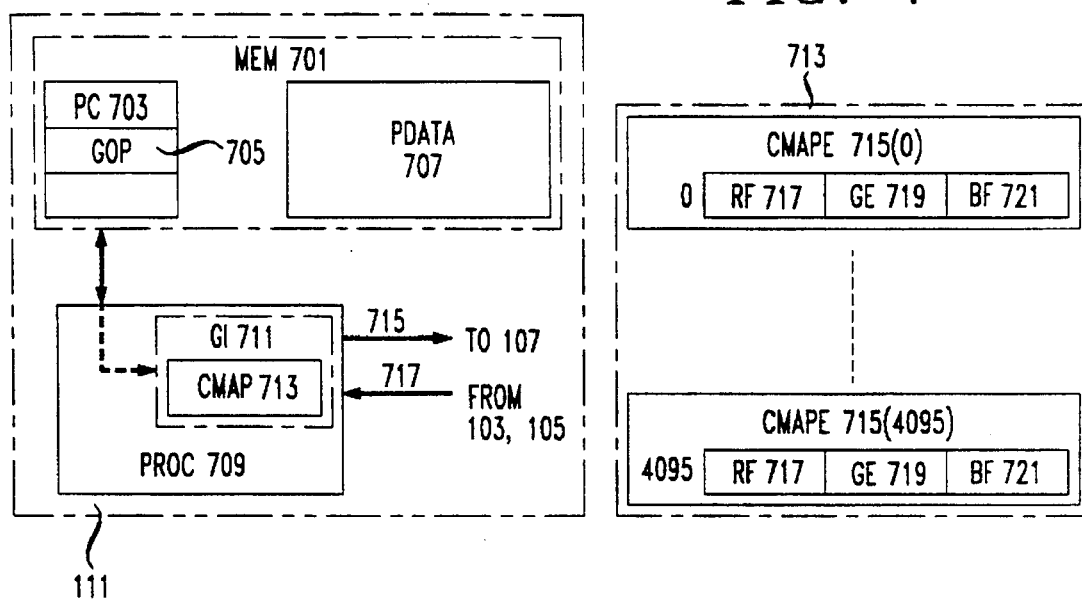
FIG. 7 is an overview of the hardware employed in the preferred embodiment.

Hardware employed in a Preferred Embodiment: FIG. 7

A preferred embodiment of the invention is implemented using a Silicon Graphics 4D/35 processor running the Personal IRIS operating system. FIG. 7 is a block diagram of processing unit 111 employing the Silicon Graphics 4D/35 processor. Processing unit 111 has two main components: memory (MEM) 701 and processor (PROC) 709. Stored in memory are program code 703, which is a program employed to implement the preferred embodiment, and program data (PDATA) 707, which is data employed in the implementation. Under control of program code 703, processing unit 709 uses program data 707 to create the displays which have just been described on display 107.

Processing unit 111 is specially designed to produce graphics displays. Included in processing unit 111 is graphics interface 711, which controls display 107 and responds to inputs from keyboard 105 and mouse 103. Graphics interface 711 is controlled by graphics operations 705 in program code 703. The graphics interface is described in detail in *Graphics Library Reference Manual, C Edition*, Document Number: 007-1203-040, Silicon Graphics Computer Systems, 1991. As already mentioned, the displays of the preferred embodiment employ colors; the colors used in the display are defined by color map 713 in graphics interface 711. As shown in detail in the lower part of FIG. 7, color map 713 has 4096 color map entries (CMAPE) 715. Individual color map entries 715 are indexed by values ranging from 0 through 4095. Each color map entry contains three fields, a red field 717, a green field 719, and a blue field 721. The values in these fields determine the intensity of a red color component, a green color component, and a blue color component, and thus define a color. For example, for the color black, all three fields have the value 0.

Three of the graphics operations 705 manipulate color map 713:

- color (<color map index>) specifies a color by specifying an index of a color map entry 715. The next pixels written in display 107 will be written in the color defined by the specified color map entry 715.
- mapcolor(<color map index>, <red value>, <green value>, <blue value>) sets the fields in color map entry 715 specified by the index value to the values specified in the remaining arguments.
- getmcolor(<color map index>, <red loc>, <green loc>, <blue loc>) writes the present values of the fields of the color map entry 715 specified by the index value to the locations in memory 701 specified by the remaining arguments.

Color map 713 can thus be used to create a "palette" of colors for use in display 107 and then to employ the colors in display 107. Further, the current contents of color map 713 can be saved in memory 701 for later reuse.

Figure 8:
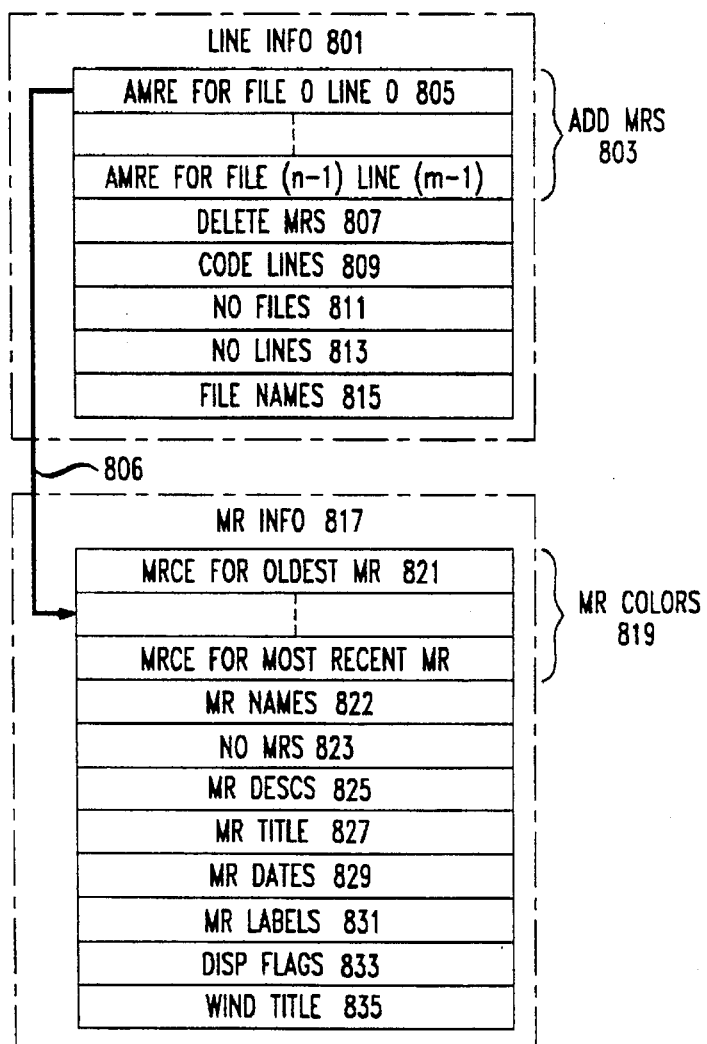
FIG. 8 is an overview of data used in the preferred embodiment.

Line and MR Data: FIG. 8

To provide for speed of operation of the preferred embodiment, the data from code body data base 113 which is the basis of the displays is copied from code body data base 113 to memory 701, where it forms pan of program data 707. The copying is performed as pan of a preprocessing operation which will be described in detail later. FIG. 8 shows the form of the data in memory 707. The data falls into two groups: line information 801, which is information concerning the lines of code in the code body, and modification request (MR) information 817, which is information concerning the modification requests corresponding to the lines of code.

The preprocessing operation sorts both the files in the code body and the modification requests. In a preferred embodiment, the files are sorted by file name; the modification requests are sorted by the values with which the colors are associated; in the present example, those values are the values of date record 139. In other embodiments, the modification requests may be sorted by other values, for example, by developer names from developers 143.

Beginning with line information 801, the first piece of information relates added lines of code to the modification requests which added the lines. Add modification requests 803 is an array which has one entry for every code file line record 118 whose AMR field 120 indicates that the line has been added. The entries for each file are in the order in which they occur on the file and the sets of entries for the files are arranged in the order in which the files were sorted. Each add modification request entry 805 contains a pointer to a location in modification request information 817 which specifies the color which is associated with the modification request which added the line.

Delete modification requests 807 is an array like add modification requests 803, except that it contains entries for each deleted line. Again, each entry has a pointer to a location in modification request information 817 which specifies the color which is associated with the modification request which deleted the line. Code lines 809 is the text of the lines of code in the body of code. The lines are arranged in the order in which they occur in the files and the files are arranged in the sorted order. Number of files 811 is an integer which specifies the number of files, and number of lines 813 is an array of integers which specifies the number of lines in each file. The integers for the files are arranged in the order into which the files were sorted. File names 815 is an array of the names of the files, again arranged in the order into which the files were sorted.

Continuing with modification request information 817, the first part of that data is an array specifying the colors associated with the modification requests. Modification request colors 819 contains an entry 821 for each modification request which affected the body of code. The entry for a given modification request appears in a location in the array which corresponds to the location of the modification request in the sorted list of modification requests, i.e., in this case, the first entry 821 is for the oldest modification request, and the last entry 821 is for the youngest modification request. As part of the preprocessing, color map 713 was set up so that there was a set of color map entries 715 corresponding to the modification requests. In that set, the colors were arranged so that the entry 715 corresponding to the oldest modification request was given the color blue, the entry 715 corresponding to the youngest the color red, and the others the colors in between. Each entry 821 contains the index in color map 713 of the color which corresponds to the modification request represented by the entry 821.

MR Names 822 is an array of the names of the modification requests. The information comes from modification request name field 125. Again, the names are in the order in which the modification requests were sorted. Field 823 specifies the number of modification requests; modification request descriptions 825 is an array which contains the abstracts 141. MR title 827 is the title which appears above line characterization column 219; it is provided as a parameter during preprocessing. MR dates 829 is an array of the dates, as specified in date field 139; again, the oldest date is the first element and the youngest the last. MR labels 829 are data used to label the MRs in line characterization column 219. The labels are in the order into which the modification requests were sorted. Display flags 833 are flags which indicate the appearance of display 201 before any input from the developer, for example, whether the split display is used at that point. Window title 835, finally, is title 203 of window 109. Both the flags and the title are provided as parameters.

The effect of the production of line information 801 and modification request information 817 from code body data base 113 is that all of the information which would result from certain queries to code data base 113 is contained in line information 801 and modification request 817 and is immediately available to the preferred embodiment. The preferred embodiment can thus provide substantially instantaneous displays of the results of those queries.

Figure 9:
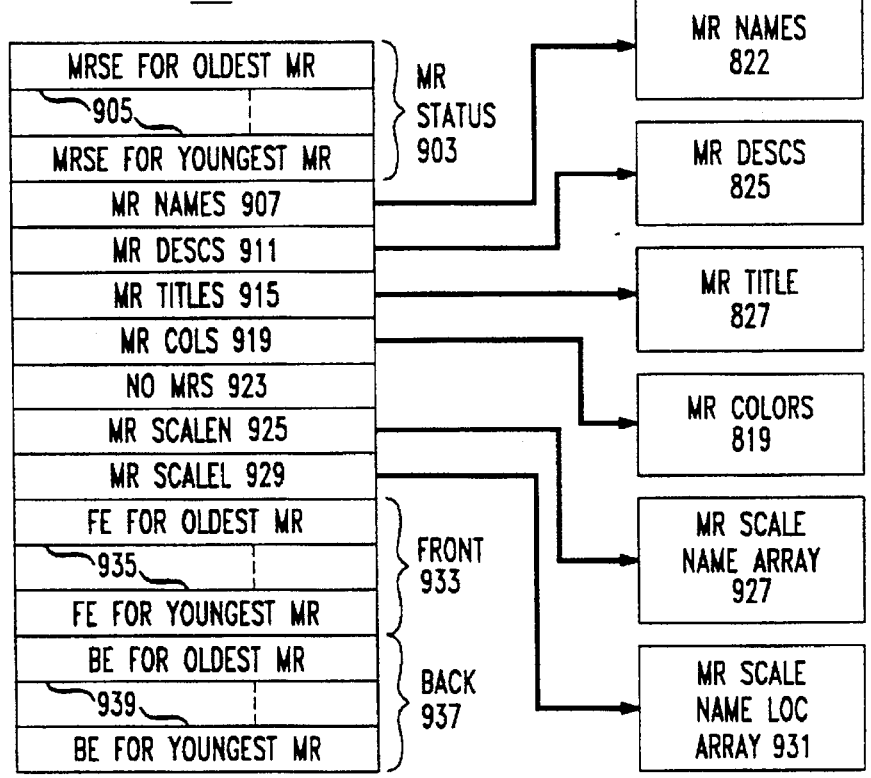
FIG. 9 is a diagram of the MR object employed in the preferred embodiment.
Figure 10:
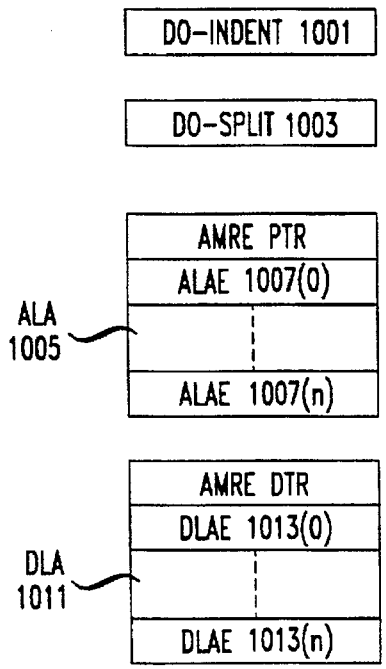
FIG. 10 is a diagram of other data used in the preferred embodiment.
Figure 11:
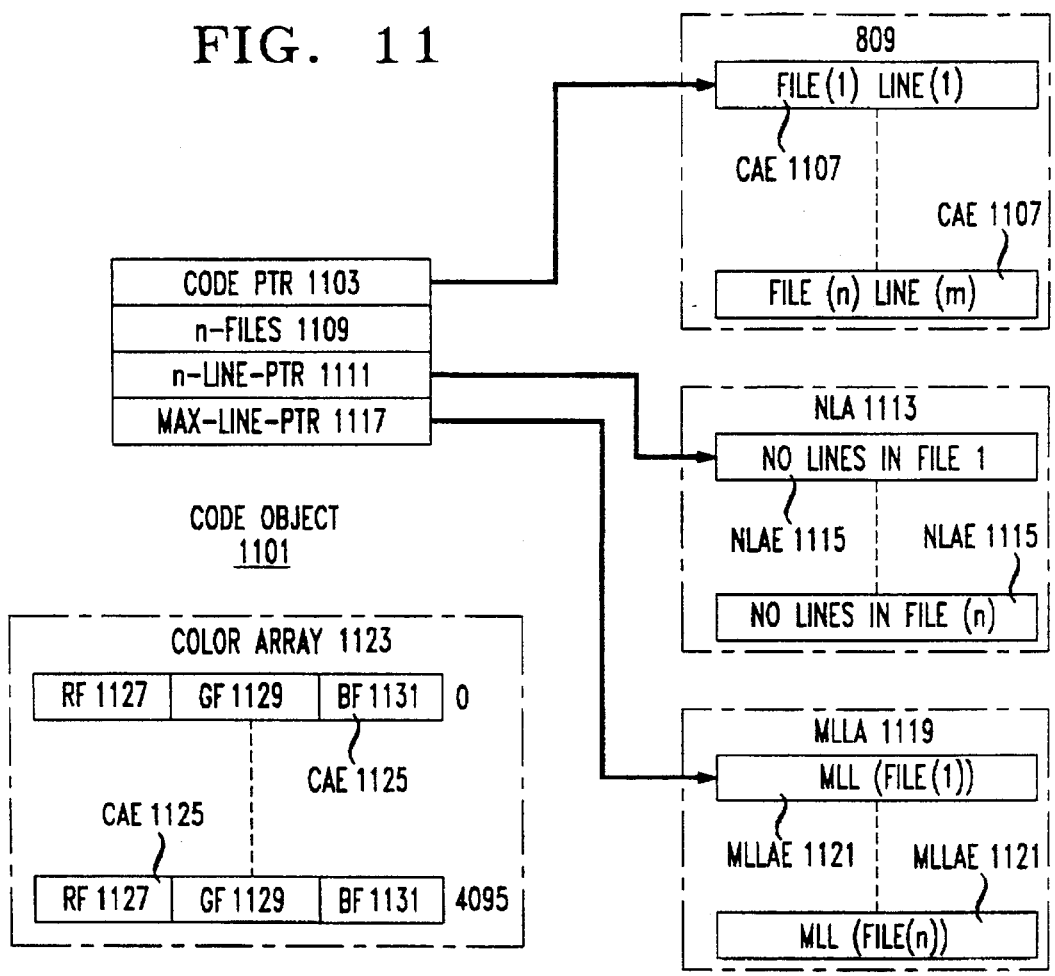
FIG. 11 is a diagram of a code object and other data used in the preferred embodiment.

Objects Employed in the Preferred Embodiment: FIGS. 9–11

The source code for program code 703 for the preferred embodiment is written using the C++ programming language, described in Bjarne Stroustrup, *The C++ Programming Language,* Addison-Wesley, Reading, Mass., 1987. C++ is an object-oriented language, and consequently, objects are employed in the source code to represent the modification requests and the code.

FIG. 9 shows data structures employed in modification request object 901, which represents the modification request. The first data structure is modification request status array 903. There is an entry 905 in array 903 for each modification request, and the entries are arranged in order from oldest to youngest. Each entry may have one of four status values: neither marked nor active, marked, active, and both marked and active. The "marked" status indicates that the modification request's label 305 is to be displayed; the "active" status indicates that the modification request is active.

Fields 907 through 919 are pointers to parts of MR INFO 817. MR NAMES 907 points to MR NAMES 822; MR DESCS 911 points to MR DESCS 825; MR TITLE 915 points to MR TITLE 827; MR COLS 919 points to MR COLORS 819. Field 923 indicates the number of modification requests; MR SCALEN 925 points to an array which contains the scale labels for line characterization column 219; MR SCALEL 929 points to an array which contains the locations for the labels.

The arrays FRONT 933 and BACK 937 are Boolean arrays. There is one element in each array for each modification request, and the value of the element indicates whether the modification request representation 303 and the line representations 205 coupled thereto are to be displayed on display 201 in black or in the color associated with the modification request. There are two arrays so that display 201 can be redrawn from FRONT while BACK 937 is being modified to incorporate the changes resulting from the movement of cursor 110 and the positions of the buttons on mouse 103.

FIG. 11 shows data structures belonging to code object 1101, which represents the code of the body of code. Code pointer 1103 points to code lines 809 in line info 801; as shown in FIG. 11, the lines are organized in order for each file, with the files in the sorted order. Number of files 1109 indicates the number of files with code in code lines 809. Number of lines pointer 111 points to a number of lines (NLA) array 1113, which contains an entry 1115 for each of the flies in 809 which indicates the number of lines in that file. The order of the entries is again the sorted order of the files. Maximum line pointer 1117, finally points to maximum line length array 1119, which has an entry 1121 for each file. The entry for a file indicates the length of the longest line in the file. The line length information is used to properly size line representations 207.

FIG. 11 also shows color array 1123, which is an array in memory 701 which is parallel to color map 713 and which retains the relationship between modification requests and colors originally set up in color map 713. There is a color array entry 1127 in color array 1123 corresponding to each color map entry 715, and like a color map entry 715, color array entry 1125 specifies a color by means of values in a red field 1127, a green field 1129, and a blue field 1131.

FIG. 10 shows other relevant data structures employed in the preferred embodiment. The variable "do_indent" indicates by its value whether line representations 207 are to show indentations. The value is set when cursor 110 is moved over button 223 and the left mouse button is pushed. The variable "do split" indicates by its value whether line representations for the added lines, the deleted lines, or both are to be displayed. Its value is set when cursor 110 is moved over button 227. Both may also be set from values in display flags 833 at the beginning of execution of program code 703. Added line array 1005 is an array of pointers to entries 805 in add modification request array 803; each of the entries 805 in turn points to an entry in MR Colors 819. Similarly, deleted line array 1011 is an array of pointers to entries in delete modification requests 807. These structures thus serve to link lines of code to the relevant modification requests.

Figure 12:
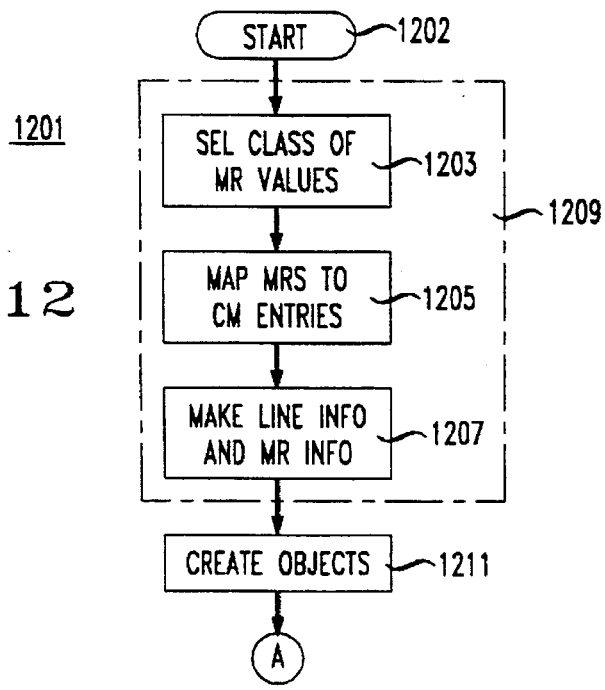
FIG. 12 is a first part of a flowchart showing operation of the preferred embodiment.
Figure 13:
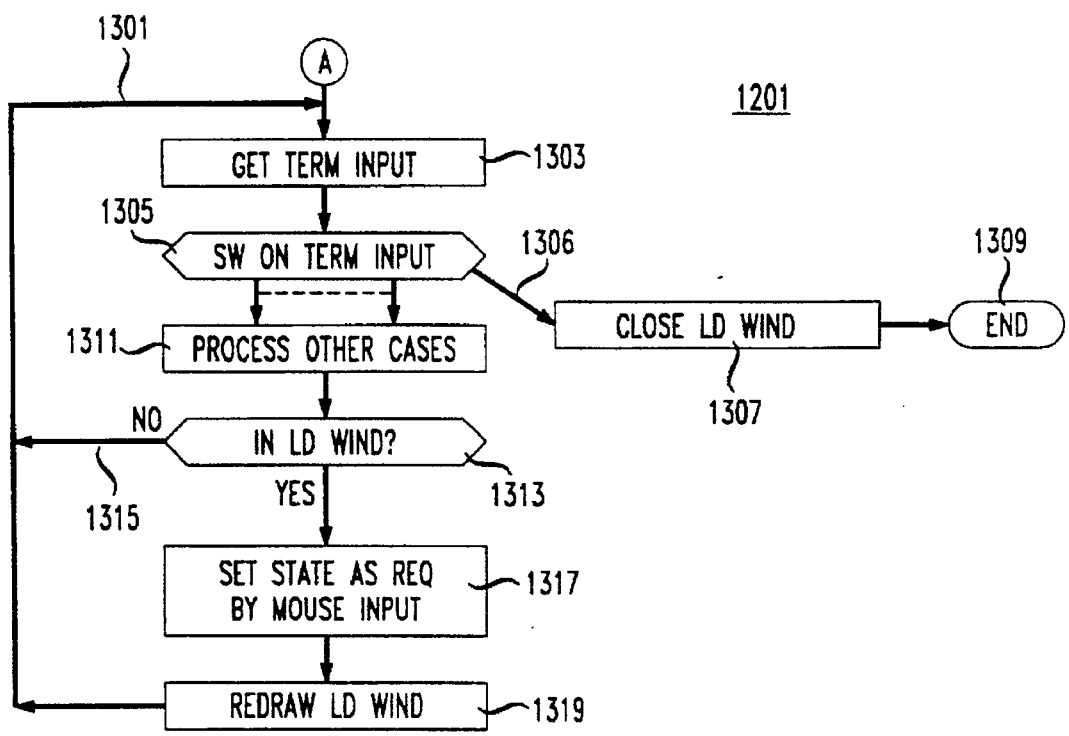
FIG. 13 is a second part of a flowchart showing operation of the preferred embodiment.

Operation of the Preferred Embodiment: FIGS. 12 and 13

FIGS. 12 and 13 together contain flowchart 1201, which presents a high-level view of the operation of the preferred embodiment. Beginning with FIG. 12, the first part of the operation of the preferred embodiment is preprocessing 1209, which prepares line info 801 and MR info 817 from data in code data base 113. The first step in the preprocessing is 1203. In that step, a class of values is selected for association with colors in color map 713. In the example we have been following so far, the selected class of values was the date on which each of the modification requests was completed; however, it is equally possible to select other classes of values. For example, if it is desired to see which code was written by which developers, the sets of developers specified in developer records 103 can be selected as the class of values and a different color can be associated with each set of developers. In the preferred embodiment, selection of the class of MR values is done in response to a parameter provided to the program which does the preprocessing.

The next step is to map the modification requests to entries 715 in color map 713. In the preferred embodiment, this is done by sorting the values of the selected class of MR values, mapping the sorted values onto entries 715, and then associating each modification request with the color onto which the selected value for that modification request was mapped. In the date example, the dates were sorted from earliest to latest, and were mapped in that order on color map entries 715 representing colors ranging from blue through green, yellow, and orange to red. Each modification request has a date, and the color onto which the modification request's date is mapped becomes the modification request's color. The results of the mapping of the selected values to the colors and of the association of the colors with the modification requests are recorded in MR colors 819, where each entry 821 for a MR contains the index of color map entry 714 for the color associated with date 139 for the given modification request.

The last step in preprocessing 1209 is to make line info 801 and MR info 817. As previously indicated, most of the information in these data structures comes from code body data base 113. Information about lines of code and the lines themselves are ordered by sorting the file names and putting the lines in the files in the order of the sorted file names; information about MRs are ordered by the sorted order of the values which were mapped onto color map 713. The values of display flags 813, MR title 827, and window title 835 are provided by parameters to the preprocessing program.

MR Info 817 and line info 801 are arguments to the program which actually produces and manipulates display 201. The first step in that program, step 1211, is to create objects including window 109 and then initialize data in the objects using values from the arguments. Among the operations performed at this point is copying the current values of color map entries 715 into the corresponding entries of color array 1123.

Once these initializations are done, main loop 1301 (FIG. 13) can begin executing. The first step in main loop 1301 is to get the value at the head of a queue of inputs from keyboard 105 and mouse 103. That value determines what happens next; if it indicates that the line display window in which display 201 appears is to be closed (branch 1306), the actions necessary to close the window are taken and the program which implements the preferred embodiment terminates, as shown in boxes 1307 and 1309.

Otherwise, the other cases are processed in 1311; no matter what case is processed, the next step is decision box 1313: if cursor 110 is in the line display window, the next step is 1317; otherwise it is 1303. In step 1317, program state is set as required by the mouse input. Some examples are the following:

If the mouse is in display space 213, the following occurs:
- If the cursor has passed over a line representation 207 or a modification request representation 303, entry 935 in FRONT array 933 for the modification request which modified the line represented by the line representation or which is represented by the modification request representation is set to TRUE.
- If the leftmost button was down when the cursor passed over the line representation 207 or modification request representation 303, MR status entry 905 for the modification request is set to "both marked and active".
- If the center button was down when the cursor passed over the line representation 207 or modification request representation 303, MR status entry 905 for the modification request is set to "neither marked nor active" and the entry in FRONT array 933 for the modification request is set to FALSE.

If the cursor is in top space 211, the following occurs: if the cursor 110 is on a file name 209, state is set so that the name will be white if the left button was pushed, red if the center button was pushed, and otherwise yellow. Then a loop is executed which does the following for each line in the file identified by the label: depending on whether the display is showing added lines, deleted lines, or both, it uses added line array 1005 and/or deleted line array 1011 to locate the entry in MR colors 819 which contains the index in color map 713 for the modification request associated with the added or deleted line. The entry in BACK 937 for that modification request is set to TRUE; if the left button is down, the state in that MR status entry 905 is set to active (or both active and marked if it was already set to marked). If the right button is down, the entry in BACK 937 for that modification request is set to FALSE and the state in that MR status entry 905 is set to neither marked nor active.

If the cursor is in right space 217, what happens depends on whether it is on line characterization column label 220 or in column 219. In the first case, state is set to change label 220's color as described for the file names 209; then, if either the left or middle button is down, for each modification request, entry 905 for the modification request in MR status array 903 is examined to determine whether its status is "marked" or "marked and active" and the status saved; next, the entry for the MR in MR status array 903 is set as required by the mouse buttons: if the left button is down, the status becomes active and the entry for the MR in BACK 937 is set to TRUE; if the center button is down, the status becomes neither marked nor active and the entry for the MR in BACK 937 is set to FALSE. Then, if the saved status of the MR is not "marked" or "marked and active", the current status of the MR is set to "active" only. The effect of this is to ensure that only those labels 305 for modification request representations 303 which were on prior to selection of column label 220 remain on when all of the modification request representations are activated.

If the cursor is in line characterization column 219, the position of cursor 110 is converted into the number of the modification request represented by the modification request representation at the cursor. The conversion is possible because the modification request representations 309 have the same order in column 219 as the modification requests have in modification request colors 819. The entries in modification request status array 903 and BACK array 937 for the modification request are then set as follows:
- Whether or not any button is down, the BACK array entry is set to TRUE;
- if the leftmost button is down, the status array entry is further set to the value "marked and active";
- if the center button is down, the BACK array entry value is reset to FALSE and the status array entry is set to the value "neither marked nor active".

An important effect of setting state as described in the foregoing discussions of the actions taken when cursor 110 is in display space 213, top space 211, or right space 217 is that the BACK array entry 939 for each modification request which was "turned on" by cursor 110 when cursor 110 passed over the modification request representation 303 for the modification request or the line representation 207 of a line affected by the modification request is set to TRUE. Further, if the leftmost or center mouse button was depressed, the MR status entry 905 for the modification request was set as required by the button, and in the case of the center mouse button, the BACK array entry 939 was set to FALSE. It is thus possible by examining BACK array 937 to determine which line representations 207 and modification request representations 303 are to be turned on as a result of the movement of cursor 110 and by examining MR status army 903 to determine which line representations 207 and modification request representations 303 are to remain on because they were selected by means of the leftmost mouse button.

Bottom space 223, finally, contains only buttons 223, 225, and 227. In the case of indent button 223 and code display type button 227, selection or deselection of the buttons changes the state of the static variables do_indent and do_split; the effect of the code view button 225 will be described in more detail later.

The final step in setting up the state is setting up color map 713 so that the color map entries 715 corresponding to the modification requests whose modification request representations 303 and associated line representations 207 are to be turned on are set to the color associated with the modification request and the color map entries 715 corresponding to the modification requests whose modification request representations 303 and associated line representations 207 are not to be turned on are set to black. Color map 713 is set up by performing a loop which for each modification request first compares BACK array entry 939 for the modification request with the FRONT array entry 935 for the modification request; if they are different, indicating that a modification request has been turned on or off, the index of that modification request's color map entry 715 is saved. Then, if the BACK array entry 939 for the modification request is TRUE, the "mapcolor" function is used to set the modification request's color map entry 715 to the values in the modification request's color array entry 1125; otherwise, "mapcolor" sets the modification request's color map entry 715 to black; thereupon, BACK array entry 939 is copied to FRONT array entry 935. This last step of course ensures that FRONT army 933 always contains the immediately previous state of BACK array 937. Finally, label 214 and any code line 515 being displayed and label 216 and any modification request abstract 517 being displayed are drawn in bottom space 215.

Returning to flow chart 1201, In the next step, 1319, display 201 is redrawn in accordance with the state that was set in step 1317 or in earlier iterations of loop 1301. In a preferred embodiment, only those parts of display 201 which have changed as a result of the mouse input are redrawn. For example, if the input concerns only display space 213, only that space is redrawn. Redrawing is done by copying the current display buffer into an empty buffer, redrawing those parts of the empty buffer which have changed, and then swapping the buffer with the redrawn display with the buffer from which display 201 is currently being displayed.

Redrawing of the various spaces is as follows: if display space 213 needs to be redrawn, a loop is executed in which column 205 for each file in the body is drawn. The column is drawn by means of the following loop: for each line of the file, the line stored in code lines 809 is first examined to determine its length and the number of leading blank spaces; then, if the variable do_indent 1001 indicates that indent button 223 was pushed, the length and starting point of line representation 203 is set accordingly; otherwise line representation 203 is the width of column 205.

Next, the line representation is drawn using the index into color map 713 specified for the line's modification request in added line array 1005, deleted line array 1011, or both, depending on whether display 201 is showing added lines, deleted lines, or both. As indicated above, if line representations 207 for the line's modification request are to be turned on, the modification request's entry in color map 713 is set to the color specified for the modification request in color array 1123; if the line representations are to be turned off, the modification request's entry 715 is set to black.

Continuing with top space 211, top space 211 is redrawn by a loop which writes each file's file name 209 above column 205 for the file. The drawing of bottom space 215 adds the current state of buttons 223, 225, and 227 to labels 214 and 216 and code and abstract lines 515 and 517.

Right space 217 is redrawn as follows: line characterization column 219 is drawn by a loop which is executed for each modification request. The loop obtains the modification request's index in color map 713 from MR colors 819, uses the color function to set the color to be written to that color, and then draws modification request representation 303; consequently, modification request representation 303 is the color for the modification request in color map 713; as indicated above, that color is black if the modification request has not been "turned on" and otherwise, the color associated with the modification request in color array 1123. Further, if MR status array entry 905 for the modification request is in the state "marked" or the state "marked and active", label 305 for the modification request is drawn next to the modification request representation. Label 305 has the same color as the modification request representation. Finally, in the preferred embodiment, the modification request date scale is drawn to the right of line characterization column 219 and title label 220 is drawn above line characterization column 220.

Figure 14:
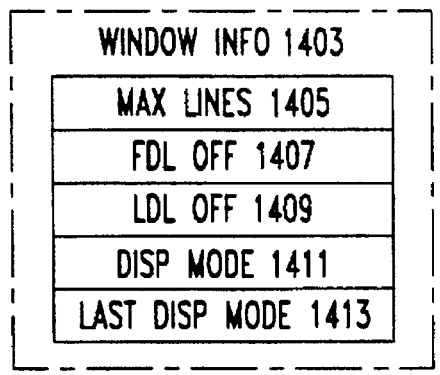
FIG. 14 is a diagram of a code viewer object.
Figure 14:
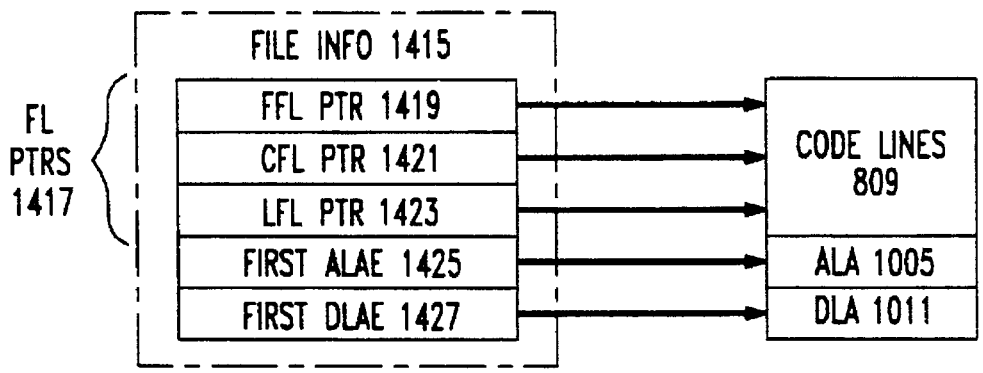
Figure 14:
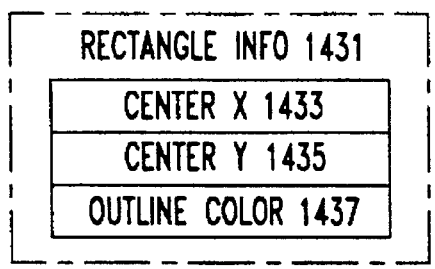
Figure 14:
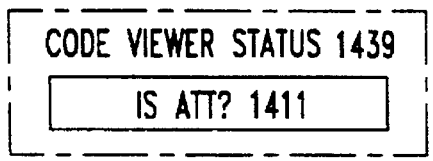

Implementation of Code Viewers: FIGS. 5, 6, and 14

As explained in the discussion of FIG. 5, when code window button 227 is pushed, the result is the appearance in display 201 of a code window 505 and an associated rectangle 504. When rectangle 504 is positioned over a group of line representations 207, code window 505 displays the lines represented by those line representations 207. Rectangle 504 and code window 505 together make up a code viewer. The preferred embodiment may have up to three code viewers. They are implemented as an array of code viewer objects. FIG. 14 shows the data employed to implement a code viewer object. The data falls into four categories: code window information 1403, which describes the lines being displayed in the code viewer's code window 505, file information 1415, which describes the file from which the lines are being displayed, rectangle information 1431, which describes rectangle 504 for the code viewer, and code viewer status 1439, which indicates whether the code viewer is attached.

Beginning with code window information 1403, the data is the following:
- maximum lines 1405 indicates the maximum number of lines which can be displayed in window 505;
- first display line offset 1407 is the offset of the first line being displayed in window 505 from the first line of the file in code lines 809;
- last display line offset 1409 is the offset of the last line being displayed in window 505 from the first line of the file in code lines 809;
- display mode pointer 1411 is a pointer to the variable do_split, which indicates whether added lines, deleted lines, or both are to be displayed; and
- last display mode 1413 indicates the display mode which was in use the last time window 505 was redrawn.

Continuing with file information 1415, that data includes:
- File line pointers 1417, which includes a pointer 1419 to the first line in code lines 809 of the file from which lines are currently being displayed in code window 505, a pointer to the line at which the center of rectangle 504 is currently positioned, and a pointer to the last line of the file.
- First added line array entry pointer 1427 points to the entry for the first line of the file in added lines array 1005; and
- first deleted line array entry pointer 1427 points to the entry for the first line of the file in deleted lines array 1011.

File information 1415 thus provides all of the information needed locate the lines in the file which are currently being displayed in the code window and to display the lines in colors corresponding to the line representations 207 for the lines.

The remaining information defines rectangle 504 and indicates whether the code viewer is attached. Rectangle information 1431 consists of the coordinates 1433 and 1435 of the center of the rectangle and the color of the outline used for the rectangle and for the associated code window. Code viewer status 1439 has the value TRUE if the code viewer is attached and otherwise FALSE.

Continuing with details of the creation and operation of a code viewer, if a developer activates button 227 with the mouse when there are less than three code viewers in display 210, the result is the creation of a new code viewer. In the course of creation, display mode 1411 is set to the current value of do_split 1003, pointers 1417 are all set to NULL, the color for the new code viewer's borders are determined, minimum sizes for code window 505 and rectangle 504 are set up, and code viewer status 1439 is set to TRUE. The developer then uses the mouse to size the window and rectangle 504 is sized proportionally to the window size.

When there are code viewers in display 207, it is necessary each time the cursor is moved to determine what the relationship is between the cursor and the code viewers. If there is an attached code viewer, cursor 110 is of course attached to that code viewer; otherwise, the program computes for each code viewer the distance between the code viewer's rectangle 504 and the current position of cursor 110 (contained in rectangle infor 1431); if the rightmost mouse button has been pushed, the code viewer whose rectangle 504 is closest to the cursor position is then attached to cursor 110. If there is an attached code viewer when the rightmost mouse button is pushed, that code viewer is detached.

The next step is to relate the currently-attached code viewer to the current cursor position. If the cursor is in a column 205, the program has previously determined which file is represented by that column. To relate the code viewer to the current cursor position, the program sets FFL PTR 1419 to point to the first line in that file, LFL PTR 1423 to point to the last line, and CFL PTR 1421 to point to the current line in the file. First ALAE 1425 and FIRST DLAE 1427 are further set to point to the first entries in added line array 1005 and deleted line array 1011 for the file. Finally, the x and y coordinates 1433 and 1435 are set from the coordinates of the current cursor position.

Creation of a cede viewer, attaching it, and relating it to the current cursor position all occur in step 1317 of flow chart 1201, in which the state for the display is set as required by the mouse input. If anything has occurred to change the state of a code viewer, that code viewer is then redrawn in step 1319, redraw line display window. How the code viewer is redrawn depends upon the value of display mode 1411. However, in all cases, the first step is to redraw rectangle 504. Next, the required lines are drawn in code window 505 by determining the first line in code window 505 and then drawing lines until the maximum number of lines in the window is reached. As each line is drawn, the entry for the line in added line array 1005, delete line array 1011, or both (in the case of a split display) is used to determine the index for the modification request in color map 713, the color for the modification request is fetched from color map 713, and the color is then used to draw the line of code.

Figure 15:
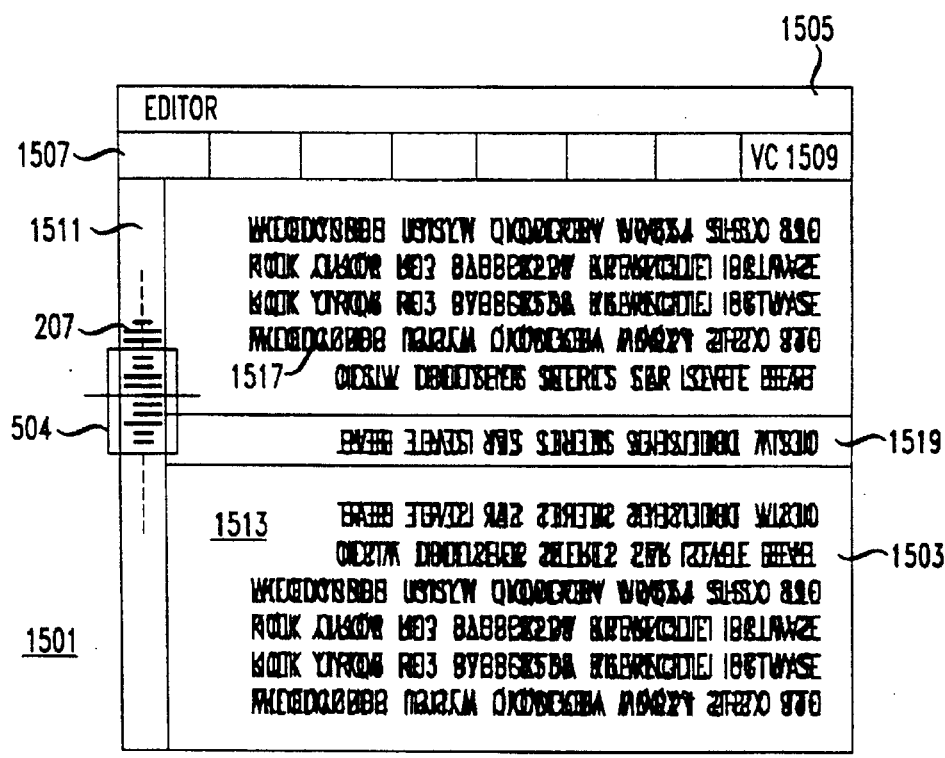
FIG. 15 is a display for a text editor incorporating the techniques of the preferred embodiment.

Other Uses of the Display Techniques: FIG. 15

The display techniques which are used in the preferred embodiment to provide developers with a variety of overviews of a large body of code and to give them access at the same time to interesting portions of the code may be used in any situation where overviews combined with detailed access are useful. In the following, a number of examples of other uses of the display techniques are described.

For instance, columns 205 might represent categories of records in a data base and line representations 207 might represent individual records in a category. A data base search for certain information contained in the records might be done on the data base, and the line representations 207 which resulted in hits might be displayed in a certain color. As a result, the user would be able to see how the hits related to the categories of records represented by the columns. Further, more than one search could be done and different colors could be associated with each search and with hits from more than one search. The user could then see how different searches related to the records in the data base, to each other, and to the categories. Such a system could also include one or more "record viewers" which worked generally like the code viewers disclosed in the present application and which permitted users to examine individual records.

The techniques used in the preferred embodiment to display the history of the body of code could be used with an inventory data base to provide an overview of the inventory. For example, if the line representations 207 represented items of inventory and the inventory data base contained the time at which an item entered inventory, the colors of the line representations could show how long the items had remained in inventory. In this case, the columns might represent categories of inventory items. Similarly, if the data base contained information from which the rate of turnover of inventory items could be determined, the colors might represent the rate of turnover. In such applications, the record viewers would give access to details about the inventory items.

Another use of the techniques would be to gain an overview of the sales of items. in such an application, each column might represent a sales outlet, the line representations 207 might be arranged so that the line representation for a given item was at the same position in each of the columns, and the color might show what the range of sales was. The display would thus permit easy comparison of what the outlets were selling and how much they were selling. Again, the record viewers would give access to details about the sales of individual items or groups of items and would permit detailed comparison of the results of different sales outlets.

There are of course many data bases in which the primary information stored in the data base is lines of text. The techniques disclosed herein with regard to lines of code are of course directly applicable to such data bases. For example, in a legal data base, a column 205 might correspond to a section of the code of laws, the line representations might represent lines in the section, and the colors might be used to indicate the legislation which caused the lines to be added to the code. The colors could also be used to relate lines of code to cases which construed them. In such an application, the code viewers could be used not only to view the lines of the law code, but also to view information such as annotations, relevant portions of the record made when the legislation which added the lines was past, and decisions interpreting the lines.

Another application of the techniques in a data base consisting of lines of text would be to use colors to represent cross references: if a line or a set of lines had cross references to other lines, then all of those lines would appear in the same color. The same technique could be used in data bases which have concordances: the user could select a word from the concordance, and all of the line representations for lines containing the word would be given the same color. In this application, the code viewers could be used to view and compare the lines containing the word. In the preferred embodiment, the split option is used to simultaneously show added and deleted lines; in other embodiments and applications of the invention, it could be used to compare different versions of the cede or different versions generally of two texts.

In the preferred embodiment, lines of code in a file have a linear order, and consequently, columns 205 are a natural representation for the files. The techniques can, however, be used in situations where the data items are arranged in a table. For example, the techniques could be used to display a number of spreadsheets simultaneously. Each spreadsheet would appear as a table in which each line representation 207 represented a cell of the spreadsheet. Colors of line representations 207 could be used to indicate information such as cell type, the kind of information contained in the cell, dependencies among the cells, or the time the cell was last modified. In this case, the cede viewers would be used to examine individual cells or groups of cells. Line representations 207 could of course be employed in three-dimensional displays in the same fashion in which they are employed in linear and tabular displays.

As is apparent from the foregoing, the techniques disclosed herein are fundamental innovations in the art of displaying information, and their application is limited only by the imaginations of those who need information and of those who build displays for them. There is, however, one area of information display technology for which the technology is particularly well-suited. That area is text editors.

In modern text editors, editing is done on displayed text. The display of the text may occupy an entire display screen, or it may be in a window 109 in a display screen. A component of most modern text editors is a scroll bar, a bar at one side of the display. The scroll bar represents the entire text file being edited. To go to the middle of the file, the user moves the cursor to the middle of the scroll bar; to go to a point ⅔ of the way down the file, he moves the cursor to a point ⅔ of the way down the scroll bar. Further, there is often a shaded area in the scroll bar which shows the position of the lines being displayed in the screen relative to the whole file. A difficulty with modern editors is that there is no level of detail displayed between that provided by the scroll bar, which represents the entire document, and that provided by the small number of lines of the document which are visible in the display. Such a level of detail may be provided by the techniques implemented in the preferred embodiment.

FIG. 15 shows display 1501 for a text editor which employs the techniques of the preferred embodiment. Display 1501 is presumed in the following to be displayed in a window 1503 on a display 107. At the top of window 1503 is title bar 1505, followed by menu bar 1507, which is used to select operations on the text being edited. The text is displayed in text display 1513, where it appears as text lines 1517. To the right of text display 1513 is scroll bar 1511. Scroll bar 1511 has a line representation 207 for every line in the text file being edited. If there are more line representations 207 than can be displayed in a single scroll bar 1511, a continuation scroll bar appears next to scroll bar 1511. To select a line in the text file, the user moves cursor 110 into scroll bar 1511. When cursor 110 is in scroll bar 1511, it is attached to a rectangle 504 which covers as many line representations 207 as display 1513 contains lines 1517. The lines 1517 corresponding to the line representations 207 inside rectangle 504 are displayed in text display 1513. The line 1519 whose line representation 207 is crossed by the horizontal line at the center of rectangle 504 appears at the center of text display 1513. Line 1519 may be set off by a technique such as a different-colored background or reverse video. In some embodiments, the position of display 1513 relative to the file may be changed from within display 1513, as well as by moving rectangle 504. In such embodiments, rectangle 504 will move in scroll bar 1511 as display 1513 moves in the file.

There are many ways in which line representations 207 may provide detailed information about the lines in the file. For example, line representations 207 may show indentations as previously described and may also show blank lines, either by a different color or by the color of scroll bar 1511, as shown in FIG. 15. Further, if the text editor marks text lines which are parts of special structures such as section headings or lists, those lines may be displayed in different colors, so that the logical structure of the document becomes visible from the line representations in scroll bar 1511. Additionally, if a word search is done on the file being edited, the line representations 207 for the lines containing the searched-for words may be given a different appearance. In some embodiments, they may be given a different color, in others, the line representations may blink, and in still others, they may become dashed.

If there is other information about the file which is linked to the lines of the file, the line representations in the scroll bar can be used to display that information, too. For example, if the text being edited was a program in the body of code with which the preferred embodiment was concerned, the line representations could show all of the information available in the modification request data base. The developer would thus be able to determine as he edited which modification request had added the line he was editing, when it was last modified, and who modified it, to name a few facts.

Finally, rectangle 504 and the line representations 207 can be used to specify the lines affected by operations such as delete and move. A delete operation in an editor using display 1503 can work as follows: the user selects delete from operations menu 1507; at that point, the user selects the lines to be deleted by using mouse 103 to select line representations 207 in scroll bar 1511. The appearance of the selected line representations changes to indicate that they are to be deleted. When the user is satisfied that the right lines have been deleted, he again selects the delete operation. The second selection causes the actual deletion to take place. A move operation would be similar, except that the selected text would be moved to a position specified on the scroll bar. Again, once line representations are made available in the scroll bar, many uses for them become apparent.

Additionally, techniques described with regard to the preferred embodiment's cede viewers may be applied in a text editor. For example, there may be more than one window in text display 1513, and each window may correspond to a rectangle 504. Attachment and detachment of the cursor from the rectangles 504 for the windows would be as described for the preferred embodiment. The use of multiple rectangles 504 would permit simultaneous comparison of different parts of the file. For example, if a user was interested in how a word was used in different parts of the file, the user could do a search, which would result in highlighted line representations, as described before, and could then use several rectangles 504 to look at the highlighted line representations and compare how the word was used in the locations.

Improvements in the Information Display Apparatus

Experience with and further development of the information display apparatus of the parent patent application has resulted in significant innovations in display 201 and the application of the information display apparatus to areas other than code maintenance. The following discussion will first present the improvements and then the new applications. The improvements fall into three categories: improvements involving the selector (line characterization column 219), improvements permitting display 201 to work with attribute values for more than one type of attribute, and improvements permitting the user to make the display of a record representation dependent on combinations of attribute values. Such a display is termed herein a conditional display. The new applications involve applying the information display apparatus to the study of error log files generated when a large telephone switch is tested and applying the apparatus to the study of code execution and test coverage.

Selector Innovations

In the information display apparatus of the parent patent application, line characterization column 219 included a representation 303 for each modification request, sorted by time from the most recent to the earliest It has since become apparent that line characterization column 219 was in fact a specific example of a much broader notion, namely that of the selector. FIG. 16 shows selector 1603. Selector 1603 in a preferred embodiment is a vertical bar which is subdivided into a section 1603 for each value of an attribute which is presently of interest. In line characterization column 219, each representation 303 was in fact a section 1605 representing the date of a modification request.

In FIG. 16, display 201 is again being used to display information about code; the columns represent files and the line representations represent lines of code. The attribute of each line which is now of interest is not the date of the modification request for the line of code, but rather the userid which identifies the programmer who wrote the line. There are seven such programmers, and consequently, selector 1603 is divided into 7 sections section 1605, one for each programmer. Each section 1605 is assigned a different color, and the sections 1605 of selector 1603 and line representations 207 are linked with each other exactly as described for modification request representations 303 and line representations 207 in the parent patent application. Of course, as in the parent application, the color scale in selector 1603 and line representations 207 could be replaced by a gray scale.

Additional information concerning the status of selector 1603 and the line representations 207 in display 1601 has been added below selector 1603. At 1607, there is shown a fraction which specifies the fraction of the total number of sections 1605 in selector 1603 that are presently activated; at 1612, there is shown a fraction which specifies the fraction of the total number of line representations 207 that are presently activated.

Proportionally-Filled Sections 1605

As is apparent from FIG. 16, when there are relatively few sections 1605, the sections 1605 are large enough to permit display of information by means of techniques other than color. An example of such a technique in a preferred embodiment is the use of proportionally-filled sections 1605. An example of such proportionally-filled sections is provided by FIG. 18. Display 1801 is being used to show what lines of code in a program were exercised by a test suite. The lines of code fall into three categories: executed by the test suite, not executed by the test suite, and not executable (declarations and the like). There are thus three sections 1605 in selector 1603: section 1803 for non-executable code, section 1805 for code that is executable but not executed by the test suite, and section 1807 for code that was executed by the test suite. The three sections are further proportionally-filled. The largest number of lines are non-executable; thus, section 1803 is completely filled from left to right by its color. Somewhat fewer lines are executable but not executed by the test suite; section 1805 for that value is filled to a degree which is the proportion of the non-executed lines to non-executable lines. Still fewer lines were actually executed by the test, and part 1811 for that value is filled to a degree which is the proportion of the actually executed lines to the non-executed lines. Put more generally, the colored part of each section 1605 shows the percentage which results when the number of lines which have that section's attribute is divided by the number of lines which have the most popular attribute. In other embodiments, the proportional filling might show other relationships involving the values and other techniques such as texturing might be used to make information visible in the sections of selector 1603.

In the preferred embodiment, selector 1603 may operate either with or without proportionally-filled sections 1603. Selection of the mode is made by placing cursor 110 on selector 1603 and pressing the right button; when that is done, a pop-up menu appears which permits the user to select the manner in which sections 1603 are to be filled. In a preferred embodiment, options for components of display 1601 are generally selected by moving cursor 110 to the component, pressing the right button, and then making a selection from the pop-up menu.

Changing the Mapping of Colors to Attribute Values In Selector 1603

It is often useful in the course of investigating a text or other set of records to narrow the investigation to records relating to a relatively small number of attribute values. A difficulty with doing that in the information display apparatus of the parent was that the attribute values of particular interest had to be selected from a much larger number of values. In the improved information display apparatus, a subset of the attribute values for which there are sections 1605 in selector 1603 may be selected and the colors for the selected sections 1605 taken from across the entire scale of colors used in selector 1603. For example, if it turned out on investigation of the body of code upon which the information display apparatus was used in the parent that only three modification requests were of interest, those three could have been selected, and the colors of the three sections would have been red, yellow, and blue. In other embodiments, the selected sections may expand to completely fill selector 1603.

Specification of the subset of attribute values to be displayed in selector 1603 is also done by means of the pop-up menu. When the menu appears, the user selects the subset-selection option and then uses the left button of the mouse to select the values in the subset. Selection may be done by selecting each value individually or by holding the left button down while the cursor is moved up or down selector 1603. To return to the full set of attribute values, the user turns selector 1603 off and back on at label 220, as discussed in the parent.

Automatic Activation of Sections 1605 in Selector 1603

One way of using the information display apparatus is to move the cursor up selector 1603 and look for patterns as individual line representations 207 are turned on and off as cursor 110 moves up selector 1603 and sections 1605 are activated and deactivated in response to the motion of cursor 110. In the improved information display apparatus which is the subject of the present patent application, the effect of moving cursor 110 up selector 1603 may be obtained automatically, leaving cursor 110 available for other operations.

Automatic activation of sections 1605 in selector 1603 is obtained by using the mouse to select animation button 1609. On selection of the button, each section 1605 in selector 1603 is activated in turn, beginning at the bottom. As each new section 1605 is activated, the previous section is deactivated. When the last section 1605 has been activated, the first section 1605 is again activated. The speed with which the sections are activated and deactivated is determined by slider 1611; to increase the speed, the user employs cursor 110 to move the line in slider 1611 up; to reduce the speed, the user moves the line in slider 1611 down.

Once the user has selected automatic activation, he may obtain a second mode of automatic activation by again using the mouse to select animation button 1609. In the second mode, the sections 1605 are activated in the same order as before, but once a section has been activated, it is not deactivated until the first section 1605 is again activated. Again, slider 1611 controls the speed. The first mode, in which sections 1605 are activated and deactivated in succession, is termed the sequential mode; the second mode is termed the drag mode. The names of the modes reflect the fact that the sequential mode behaves as though the user had employed the left-hand button of the mouse to touch each section 1605 in turn and the drag mode behaves as though the user had employed the mouse to move cursor 110 up selector 1605 while keeping the left-hand mouse button depressed. To end an automatic activation, the user again uses the mouse to select animation button 1609.

Variations on the techniques described above are of course possible. For example, only sections 1605 belonging to a predetermined pattern may be activated and deactivated during automatic activation. One such pattern might be those sections 1605 which were active at the time automatic activation began. Other approaches to controlling automatic activation are also possible. Clicking on animation button 1609 might cause a pop-up menu to appear which permitted the user to specify the mode and included on and off buttons for turning the animation on and off.

Conditional Display of Record Representations

In the information display apparatus of the parent patent application, there were various types of attribute which could be associated with a line of code, but only one type of attribute was available at a given time in display 201. The type of attribute for which values were to be associated with the colors was specified by a parameter to the program which did the preprocessing, and the preprocessing associated the values of the single attribute type with a set of colors.

In the improved information display apparatus, more than one type of attribute may be specified to the preprocessing program, and the preprocessing program associates the values of each of the attribute types with a set of colors. Further, the name of each of the attribute types appears in display 1601 and the user may select the attribute type for which he wishes the colors in display 1601 to represent values. The list of names of the available attribute types appears as column 1623 in area 1613 of display 1601. Selection is by moving cursor 110 to the name of the attribute type and then pressing the left button of the mouse. On selection, the selected attribute type becomes the foreground attribute type and the sections 1605 of selector 1603 represent the values of the selected attribute type. If any of the values were active when the selected attribute type was last deselected, the sections 1605 for those values and the line representations 207 for the entities having those values take on the colors which are associated with those values of the selected attribute type. The name of the foreground attribute type in column 1623 is displayed in yellow and the row in area 1623 containing the name is underlined in blue. Deselection of a foreground attribute type is done by moving cursor 110 to the name of the foreground attribute type and pressing the center mouse button.

The availability of more than one attribute type in display 1601 permits the conditional display of a line representation 207. Conditional display permits the user of display 1601 to see how the entities whose line representations 207 are being displayed relate to combinations of values from different attribute types. In conditional display, whether a line representation 207 is active depends on the values which are associated with the line for two or more attribute types. Display 1601 shows such a conditional display. Among the attribute types available for display in display 1601 are userid, which identifies the programmer who wrote the line, and bugnew, which indicates whether the line was added as part of a new feature or was written to fix a bug. bugnew has only two values: bug, if the line was written to fix a bug, and new, if it was added as part of a new feature. In display 1601, all of the foreground attribute values, i.e., the values for userid are active. The display of 1601 activates a line representation 207 only if

• it was written by one of the programmers whose userid is active in selector 1603 AND
• it was added to fix a bug.

The color of the line representation 207 in conditional display is determined by the color associated with the line representation 207 for the foreground attribute type.

To set up a conditional display, the user simply specifies one or more of the other attribute types as a background attribute type. To do so, the user simply moves cursor 110 to screen area 1613 and clicks with the right mouse button on an attribute type other than the current foreground attribute type. That attribute type now becomes a background attribute type. In a preferred embodiment, a red bar appears under the row in area 1613 which contains the selected background attribute type's name.

As soon as a background attribute type has been selected, display 1601 begins operating in conditional display mode. As a result, the line representations 207 for the lines having the selected attribute values of the foreground attribute type become active only if all attribute values for the lines in the background attributes are also active. Once display 201 has thus been put into conditional display mode, cursor 110 or automation as described above may be used to select additional or different foreground attribute values, and the line representations 207 corresponding to those foreground attribute values will also be conditionally displayed.

A further refinement in the conditional display in a preferred embodiment is that if the right button of the mouse is held down during conditional display mode, all of the line representations which are activated by selector 1603 are turned on and those whose display is conditional blink on and off. To turn the conditional display mode for an attribute type off, the user moves cursor 110 to the attribute type's name in column 1623 and clicks with the right mouse button.

Column 1621 in section 1613 contains current attribute values for each of the attribute types. The current attribute value for the foreground attribute type is the attribute value of the last line representation 207 touched by cursor 110; the current attribute values for the background attribute types are the attribute values of the last line representations 207 touched by cursor 110 while the background attribute type was last a foreground attribute type.

In other embodiments, other methods may be used to place display 1601 in conditional display mode and to select background attribute types and values. For example, display 1601 might be placed in conditional display mode by means of a button in display 1601 itself or a pop-up menu which appears when cursor 110 is in area 1613 and the rightmost mouse button is depressed. Further, each background attribute type might have its own selector visible next to selector 1603, with the selected values indicated on the attribute type's selector. In such an embodiment, the selectors for the background attribute types might be gray or less intensely colored than the selector for the foreground attribute type. Finally, while the line representation 207 in the preferred embodiment is activated only if the line representation has all of the background attribute values and an active foreground attribute value, that is, activation is determined by the AND of the active status of the foreground and background attribute values, in principle, any Boolean or other mathematical expression could be used to determine when a line representation is displayed in a conditional display and provision might be made in display 1601 for the specification of such an expression.

The conditional display technique is of course not limited to use with line representations 207 or selector 1603, but may be used in any situation where an area of the display may be associated with values belonging to more than one attribute type. For example, the display might consist of a map of the United States showing the states and a selector 1603. The colors in selector 1603 would represent values of a statistical attribute associated with the states and the colors of each state in the map would represent the value of the statistical attribute for the state. The states in the map and the colors in selector 1603 would be linked in exactly the same way as for the line representations and the colors in selector 1603. If there was more than one type of statistical attribute associated with each state, conditional displays of states in the map could be done in exactly the same fashion as described for line representations 207. Of course, the selector is not the only way in which conditional values could be selected. For example, the values might be selected from a display of a plot of values.

Displaying Differences between Subsets of Values

An important advantage of display 1601 is that a user may easily select a subset of the values of the current foreground attribute type and see the pattern of activated line representations 207 produced by the selected subset. This advantage may be increased by making what does not belong to the subset visible. In a preferred embodiment, this is accomplished by button 1609. When button 1609 is clicked on with the mouse, display 1601 switches between two modes. In the first mode, inactive line representations 207 and sections 603 are simply black; in the second mode, inactive line representations 207 and sections 1603 are made visible by displaying them using a light gray color.

Another variation of the same idea would set up display 1601 so that the most recent previous subset remains visible to the extent that it is not included in the currently selected subset. This can be done simply by displaying those sections 1605 and line representations 207 from the previous subset which are not active in the present subset in the light gray color. Selection of such a display mode would be by pop-up menu or by button.

Implementation of the Innovations

The following discussion of the implementation will first present the relevant data structures and then will describe how they are employed in the innovative operations.

Figure 17:
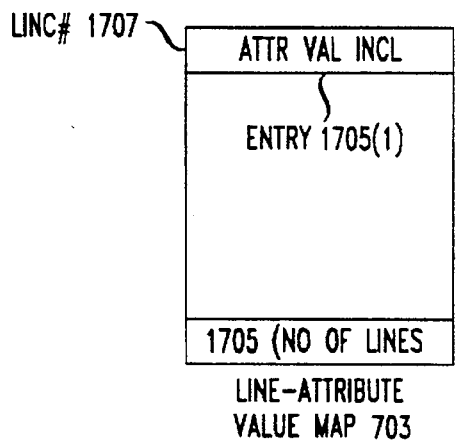
FIG. 17 is a diagram of attribute data structures in the improved information display apparatus.
Figure 17:
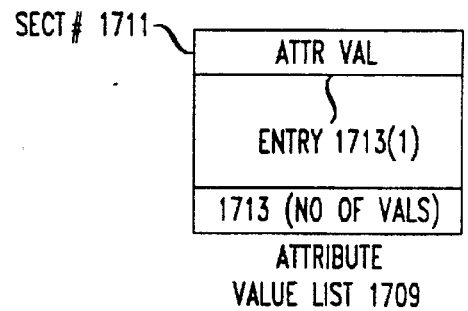
Figure 17:
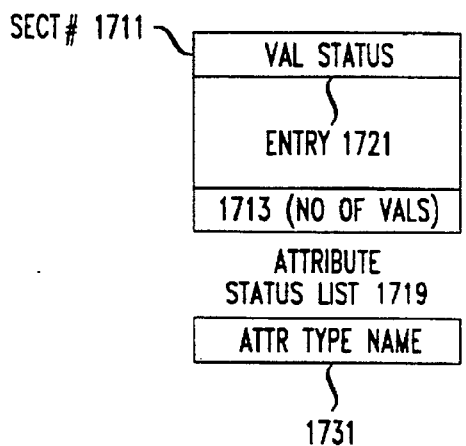
Figure 17:
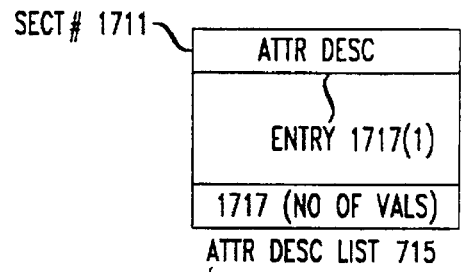
Figure 17:
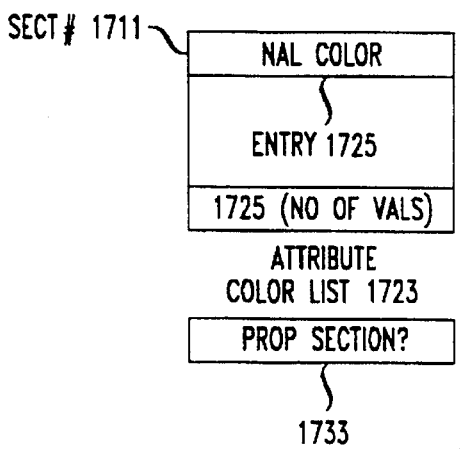
Figure 17:
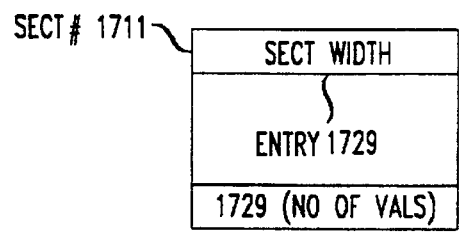
Figure 17:
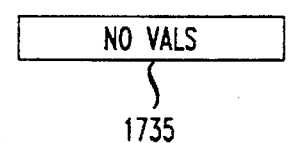
Figure 20:
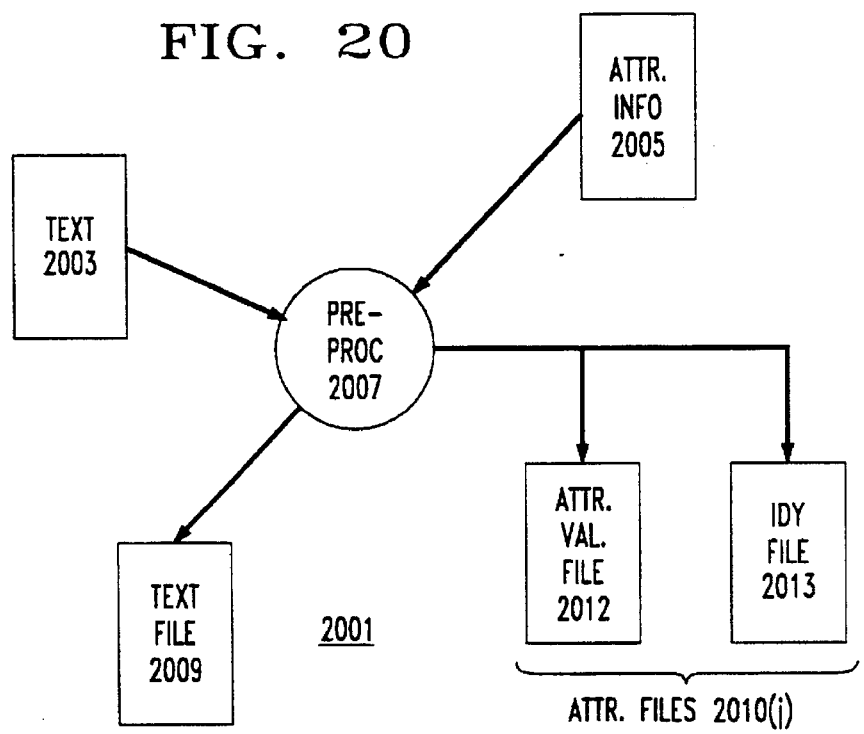
FIG. 20 is a diagram of files produced by preprocessing in a preferred embodiment.
Figure 22:
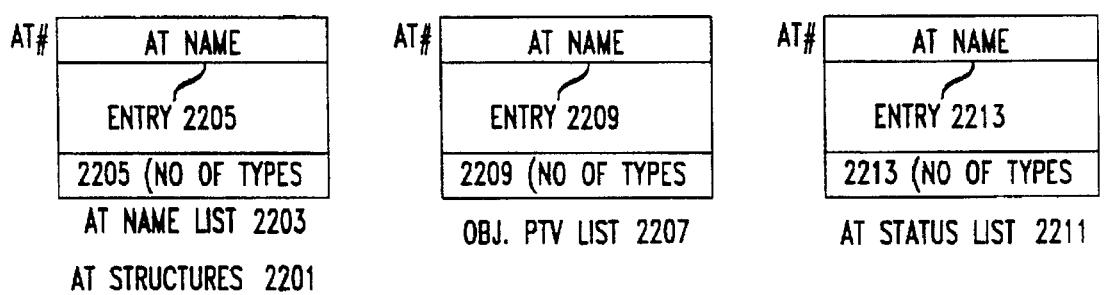
FIG. 22 is a diagram of attribute type data structures and the selector object in the preferred embodiment.
Figure 22:
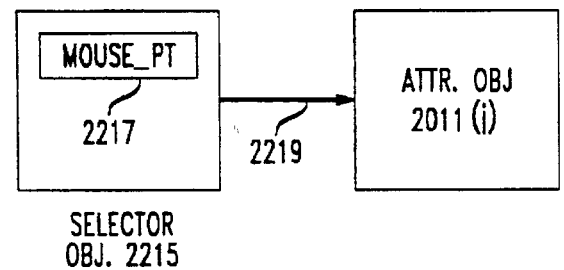

Data Structures: FIGS. 17,20, and 22

The innovations of the present embodiment are implemented using attribute objects and a selector object. As shown in FIG. 20, attribute objects are produced during preprocessing of the information upon which the information display apparatus is being employed. Preprocessor 2007, which is implemented by means of a program executing in a computer system, receives text (or other record set) 2003 and attribute information 2005 as inputs. Preprocessor 2007 then produces text file 2009, which contains the text or other record set in the order in which line representations 207 and file columns 205 are to appear in display 1601. Preprocessor 2007 additionally produces one set of attribute files 2010 for each attribute type which is to be available for use in display 1601. For example, for that display, there would be seven sets of attribute files 2010. Each set of attribute files 2010 contains attribute value file 2012, which contains an entry for each text line. The entry contains the attribute value associated with the line for that attribute type. If them is a description associated with an attribute value, the descriptions go into description index file 2015, which contains the descriptions. The descriptions in file 2015 are ordered to correspond to the order of the attribute values. In a preferred embodiment, finally, the user may specify the order in which he wishes his attribute values to appear in selector 1603, the relationship between values and colors, and the relationship between values and descriptions of the values. This is done in index file 2013, which is optional. There is an entry in index file 2013 for each attribute value, and the order of the entries is the order in which the user wishes the values to appear in selector 1603. Each entry has the red, green, and blue values for the color to be associated with the value, the value itself, and the description to be associated with the value. Taken together, each set of attribute file 2010 contains information which relates text lines to attribute values and attribute values to colors and attribute descriptions, and thereby permits definition of selector 1603 and the linkage between sections 1605 of selector 1603 and line representations 207.

FIG. 17 shows relevant data structures of a single attribute object 1701(j) for an attribute type. Each attribute object 1701 is made from the information in attribute files 2010 for the corresponding attribute type when the display for the information display apparatus is initialized. Continuing in detail, line-attribute value map 1703 is an array which has one entry 1705 for each line. The entries are ordered by line number and each entry 1705 contains the location of the attribute value for the line corresponding to the entry in attribute value list 1709. Map 1703 thus permits the value of an attribute associated with a line to be known from the line number.

Most of the remaining data structures in attribute object 1701(j) are arrays which establish correspondences between the order of the sections 1605 of selector 1603 and information needed to display selector 1603. The number of entries in each array is specified by number of values 1735. Attribute value list 1709 is an array which has one entry 1713 for each distinct value of the attribute's type. If no order for the attribute values is specified in index file 2013, a set consisting of all of the distinct attribute values in attribute file 2012 is sorted to determine the order. The order of the entries in attribute value list 1719 in turn determines the order of the sections 1605 in selector 1603 and the order of the entries in the other lists of attribute object 1701.

Attribute description list 1715 is an array which has one entry 1717 for the description for each attribute value (the abstract of the MR in the parent application is an example of such a description). The descriptions and their order are obtained from index file 2013. Attribute status list 1719 contains an entry 1721 for each attribute value which indicates the value's status. In the preferred embodiment, entry 1721 may have one of three values: off, transition, and on. Off indicates simply that the value is inactive in display 1601; transition indicates that it is active in display 1601 and became so because cursor 110 had touched either the value's section 1605 in selector 1603 or a line representation 207 for a line which has the value associated with it; on indicates that the value is active in display 1601 and became so because it was turned on by moving cursor 110 to either the section 1605 for the value or a line representation 207 for a line with which the value is associated and clicking. If the status specifies that the value is active, its section 1605 will display the color corresponding to the attribute value. The value's status is of course also employed in conditional display mode.

Attribute color list 1723 contains an entry for each attribute value which indicates the color which should be displayed in section 1605 of selector 1603 for the value and the color which should be displayed in all line representations 207 representing lines with which the attribute value is associated. The color is indicated by means of an index into an array. The entry indicated by the index specifies the color by specifying the red, green, and blue values which produce the color in the display. If there was an index file 2013, the colors specified in color list 1723 are those specified in the index file 2013; otherwise, the colors are determined by mapping the values onto the colors in a standard color wheel. Section width list 1727, finally, contains entries which indicate the width of the attribute value's section when proportionally-filled sections are specified. The proportions are computed using attribute value file 2012. Further arrays like those just discussed may be provided for purposes such as specifying labels for the sections 1605 or scales for selector 1603.

Attribute object 1701(j) further contains attribute type name 1731 and a value 1733 indicating whether proportional sections are being displayed. This value is set and reset by means of the pop-up menu, as previously described.

As can be seen from the foregoing description, the attribute object 1701 contains all of the information required to set up selector 603, to display selector 603, to activate and deactivate attribute values, and to determine how line representations 207 should be displayed. The information required to relate selector 603 to an attribute object 1701 is contained in the data structures shown in FIG. 22. Beginning with attribute type structures 2201, these structures are a set of arrays which store information about attribute types. These arrays are created when the information display apparatus is initialized. Each array has an entry for each attribute type whose name appears in column 1623, and the entries are ordered as required to produce the desired display in column 1623. Included in the arrays are attribute type name list 2203, in which each entry 2205 has the name of an attribute type, object pointer list 2209, in which each entry 2209 has a pointer to the attribute object 1701 for the attribute type, and attribute type status list 2211. Each entry 2213 in attribute type status list 2211 indicates whether the attribute type is a background attribute type.

When the information display apparatus is operating, there is a single instance of selector object 2215, which represents selector 1603. Selector object 2215 contains the value mouse_pt, which indicates the present position of cursor 110 in selector 1603, and otherwise contains pointers 2219 to the data in attribute object 1701 for the foreground attribute type. The data in the attribute object 1701 for the foreground attribute type is used and modified as required by the operations performed by the user.

Implementation of the Operations

In the following, the implementation of the operations will be described in the order in which the operations themselves were described, beginning with proportionally-filled sections 1605. When the proportionally-filled option is chosen, proportional section value 733 in attribute object 1701 for the foreground attribute type is set to TRUE. When selector 1603 is redrawn, the routine which does the redrawing reads proportional section value 1733, and if it is TRUE, the routine uses the section widths specified in section width list 1727 to draw the sections 1605.

When the user indicates that he wishes to change the mapping of colors to attribute values in selector 1603, the implementation first maps each attribute value in turn onto the colors of the color wheel such that the colors of the attribute values are evenly distributed across the color wheel, and the lowest attribute value is blue and the highest red. After an attribute value has been mapped, the red, green, and blue values for the attribute value's color are determined, the array entry for the red, green, and blue values is located, and the index of that array is placed in attribute color list entry 1725 for the attribute value. When the line representations 207 for lines having the attribute value are next redrawn, they have the color specified in attribute color list 1723, and thus appear in the new color. In embodiments in which the selected attribute values fill the entire selector 1603, attribute object 1701 will include a table which maps the number of each section 1605 to the attribute value which it represents.

Automatic activation of selector 1603 is done by a routine which works on attribute status list 1719 for the foreground attribute type. The routine works sequentially through attribute status list 1719 and changes the value of the status in an entry as described below. The time delay between changes in entries is determined by slider 1611. In sequential mode, the routine sets the status in the current entry 1721 to inactive and the status in the next entry 1721 to active as it goes; in drag mode, it leaves the status in the current entry active until it reaches the top of the slider, at which point it sets all of the entries to inactive and begins again at the bottom.

Selecting foreground and background attribute types is done using attribute structures 2201. When the user selects a foreground attribute type by placing cursor 110 on an attribute type name in column 1623 and pressing the leftmost button, the routine that responds to that action locates the entry on object pointer list 2207 for the selected attribute type and provides the pointer in the entry 2209 to a routine which sets the pointers in selector object 2215 to point to the data structures in the attribute object 1701 for the selected attribute type. Selector 1603 is then redrawn as required for the new attribute type. When the user selects a background attribute type by placing cursor 110 on an attribute type name in column 1623 and pressing the rightmost button, the attribute type is selected as a background attribute type. The effect of the selection is to set entry 2213 for the attribute type in attribute type status list 2211 to indicate that the attribute type is a background type.

The conditional display is done by the routine which indicates whether line representations 207 are to be redrawn. For each line corresponding to a line representation 207, the routine determines the foreground attribute value for the line from line-attribute value map 1703; then it uses attribute status list 1719 for the foreground attribute type to determine whether that attribute value is active; if it is not, the routine indicates that the line representation 207 is not to be redrawn in the color corresponding to the attribute value. If it is, the routine begins examining entries in attribute type status list 2211. If an entry's status indicates that the attribute type is a background attribute type, the routine consults line-attribute value map 1703 for the line in question in the background attribute type's attribute object to obtain the value of the attribute of the background type for the line. It then determines from attribute status list 1719 for the background attribute type whether the value is active; if it is not, the routine indicates that line representation 207 for the line is not to be redrawn. The routine continues thus for all of the background attribute types, and indicates that the line representation 207 is to be redrawn only if the attribute value for the line is active in the foreground attribute type and in all of the background attribute types.

In embodiments which show all inactive line representations 207 and sections 1603, all that need be done is determine from attribute status list 1719 which attribute values are inactive and draw the sections 1603 for those values and line representations 207 for lines having inactive attribute values in gray. In embodiments, finally, which display the differences between subsets of values, attribute type object 1701 will contain a prior attribute status list which will indicate the immediately preceding status of the attribute values. When a line is redrawn, both lists will be consulted, and if the line's attribute value is on the prior list but not on the attribute status list, the line representation 207 for the line will be drawn in gray.

New Applications of the Information Display Apparatus

Experience has shown that the information display apparatus disclosed in the parent patent application and the present patent application may be employed in any situation where an attribute value is or can be associated with a record, and that it is particularly useful in situations where there is a natural order to the records which is known to the user and can be shown in the columns and line descriptions of display 201 or 1601. Of course the prime examples of such situations are collections of texts, be they files of program source code, collections of statutes, collections of cases, or collections of books or articles. In the following, two new examples of how the information display apparatus may be used with text will be provided. One use is as a code execution analyzer, the other is as an error log file analyzer.

Figure 18:
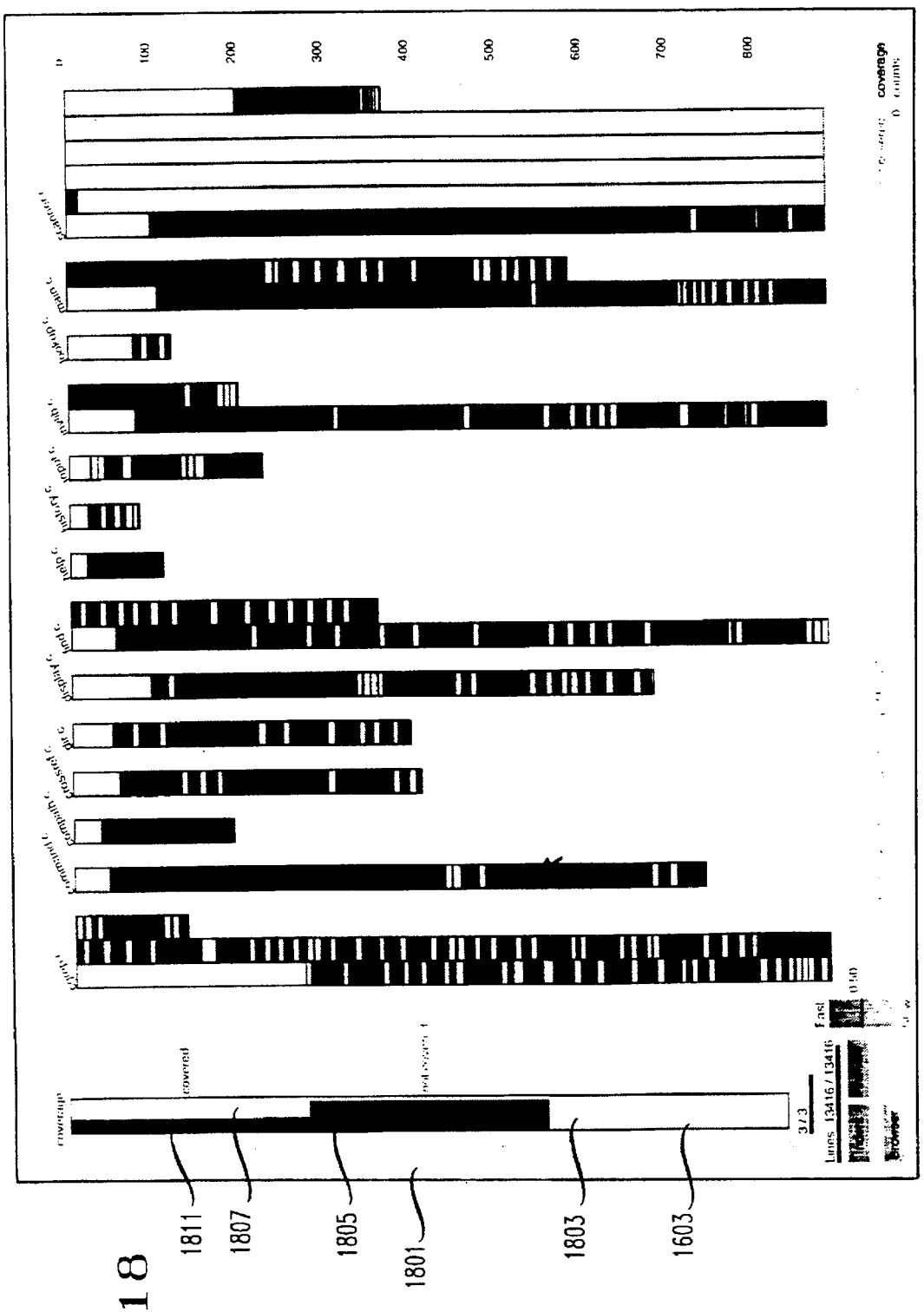
FIG. 18 is a diagram of a first display produced by a code analyzer using the improved information display apparatus.
Figure 19:
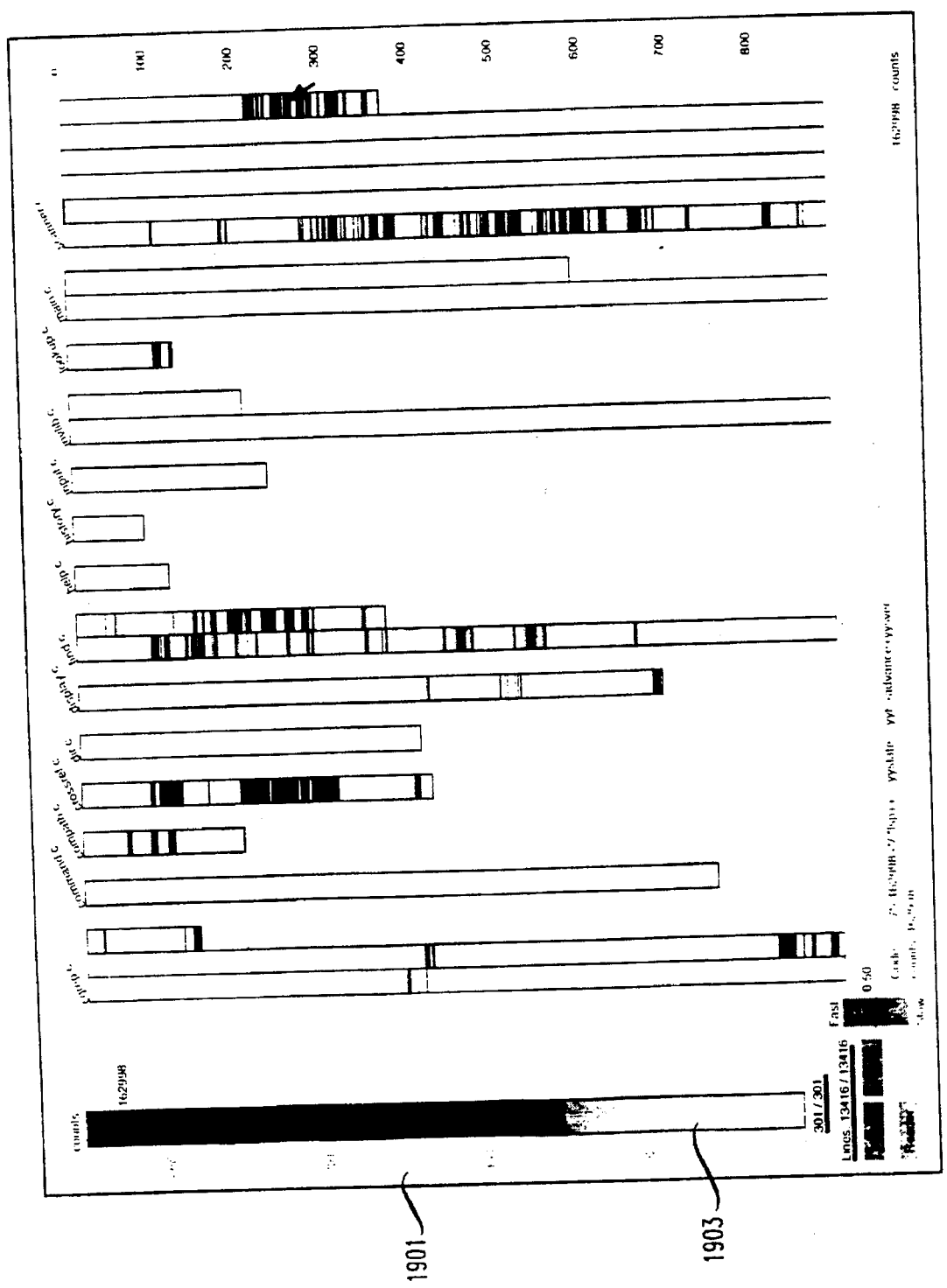
FIG. 19 is a diagram of a second display produced by a code analyzer using the improved information display apparatus.

The Code Execution Analyzer: FIGS. 18 and 19

Once the source code for a computer program has been written, the code is compiled or assembled to produce executable code and is then tested by executing the code. Two common aims in such testing are determining how the efficiency of the code might be improved and determining whether the code is free of bugs. The information display apparatus may be used to make both types of testing easier and more efficient.

In both of these applications, the information display apparatus is used in combination with a common type of low-level code profiling utility. The utility is an option on a compiler or assembler which permits the user of the compiler or assembler to insert instructions in the executable code for the program which instrument the program such that every time a line of the code is executed a counter associated with the line is incremented. At the end of the execution, the utility provides a list of line numbers and values associated with each line which indicate whether the code was non-executable and the number of times the executable code was executed. One example of such a utility is described in Peter Weinberger, "Cheap Dynamic Instruction Counting," *AT&T Bell Laboratories Technical Journal*, Vol. 63, No. 8, pp. 1815–26, October 1984.

The values produced by the code profiling utility can then be used as attributes for the lines of code and the information display apparatus may be employed to display the relationship between the lines of code and the attributes. One such display is shown in FIG. 18. The purpose of the display is to show the amount of code covered during execution of a test suite. The code profiling was done while the program executed the test suite. In display 1801, the values produced by the code profiling utility are reduced to three attribute values: one indicating non-executable code, one indicating executable code that has not been executed, and one indicating code that has been executed at least once. The colors assigned to the values are gray for the lines of non-executable code, red for the lines of executable code which were not executed, and blue for the lines of executable code which were in fact executed. Further, as previously mentioned, proportional display was employed in sections 1605 of selector 1603. It is easy to see by looking at display 1801 that the test suite did not do a particularly good job of "covering" the code.

Another such display is shown in FIG. 19. The purpose of the display is to show "hot spots" in the code, that is, lines that are executed a large number of times. Areas of frequently-executed code are of course prime candidates for optimization. In display 1091, the values produced by the code profiling utility are mapped into colors as follows: black for nonexecutable code (the black appears as blank rows in FIG. 19), gray for executable code that was not executed, and the range of numbers of times that lines are executed is mapped onto the range of colors blue through red. The mapping is done logarithmically, so that the blue end of selector 1903 indicates lines executed hundreds of times, while the red end indicates lines executed millions of times. The "hot spots" show up as portions of columns 205 containing red line representations 207. Because the scale includes black for nonexecutable code and gray for executable code that was not executed, display 1901 shows test coverage as well as hot spots.

Displaying Log Files

Computer systems generate copious log files as a part of normal operations. The files contain messages detailing system errors, application errors, status, and other information about the system's performance. For problem tracing, log files are an indispensable tool. This is particularly true for transaction processing systems and other systems with high reliability requirements. Administrators must carefully monitor these systems' log files to catch potential problems before they affect system performance.

Log files are often cluttered with unimportant messages which complicates problem analysis. Such messages are termed log noise. There may be thousands of status messages per test run comprising several megabytes of output.

Real problems may be hidden within the noise and too much noise may cause human analysts to miss critical messages.

Analysis of log files is made much easier by use of the information display apparatus. The following example shows how the information display apparatus can be used to simplify analysis of ROP (Read Only Printer) log files produced when a new version of the 5ESS™ electronic switch manufactured by AT&T is tested. The 5ESS is a multi-processor, multi-process, distributed, highly reliable, fault tolerant, telecommunications switch. It has been developed over the last 15 years by AT&T and contains several million lines of code. As part of the development process, versions of the software are rebuilt continuously. The builds are soaked overnight using lab machines before being made available for developer testing. Problems must be detected, analyzed, and prioritized for repair after every session.

Early in the development process the ROP listings from test sessions may contain hundreds of pages of potential problems. The messages are cryptic and even the developers have difficulty relating the messages to their code. A root problem may cause a cascade of subsequent corrective actions with their concomitant messages. For any individual message it is hard to know if it is itself a problem or if it is the result of an earlier problem. In multi-processor systems an "earlier" problem may appear later in the log because messages are not guaranteed to be in time order. The inconsistent message formats challenge mechanized analysis. From individual messages it is difficult to gain insight into the overall patterns of a process or processor. It is a hard, tedious, time-consuming, error-prone task for experts to analyze the ROP to determine which messages correspond to real problems, what the root causes are, which have already been discovered, which are new, and their priority for resolution.

Figure 21:
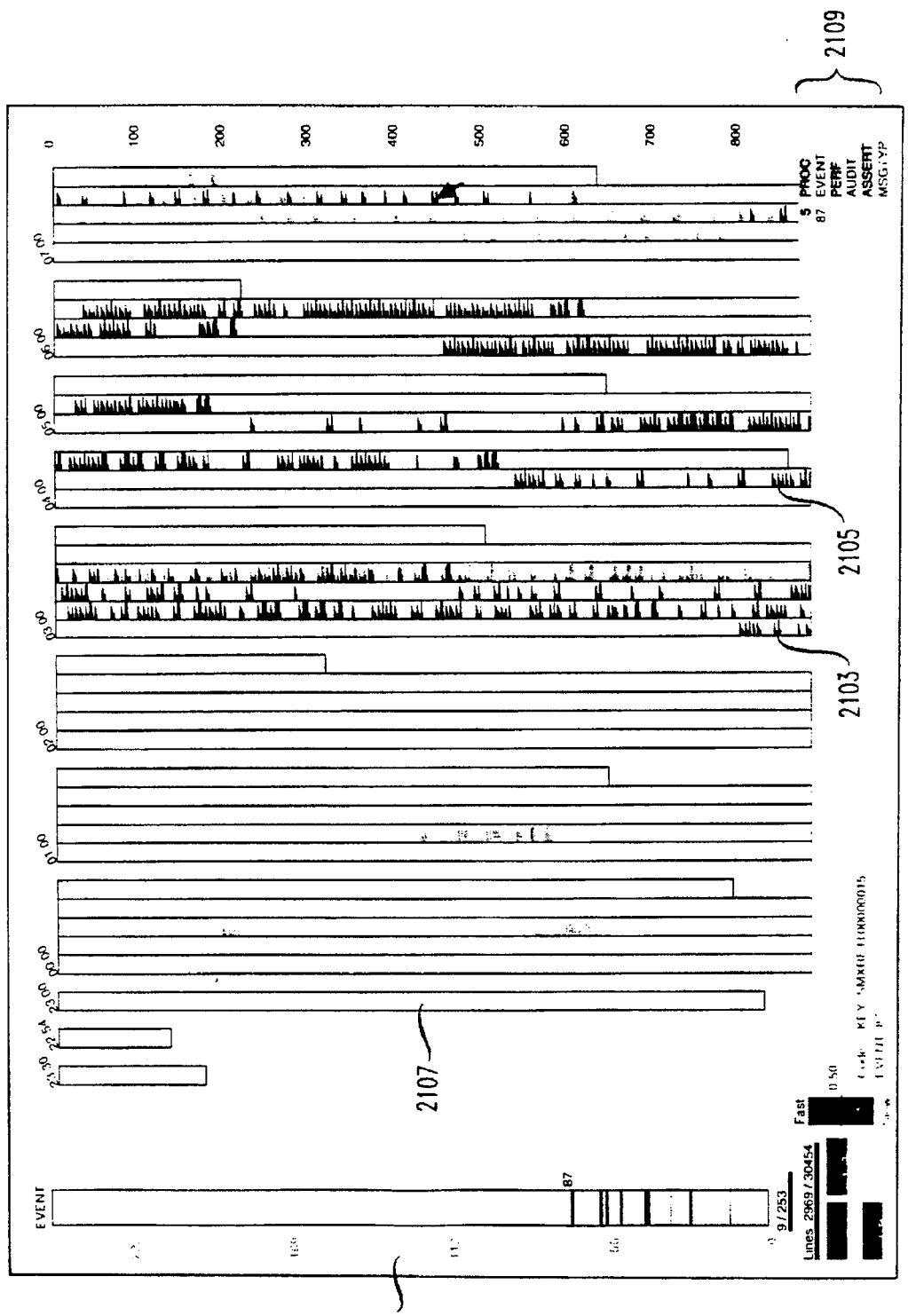
FIG. 21 is a diagram of the display produced by an error log analyzer using the improved information display apparatus.

FIG. 21 shows portions of a log file being displayed using the information display apparatus. Each column 2107 contains one hour's worth of messages in the log file. The lines of the messages themselves are represented by line representations 207 whose lengths correspond to the lengths of the lines of the messages, as described in the parent patent application. An advantage of this form of representation is that a skilled analyst can recognize different kinds of error messages from the appearance of their line representations 207 (see for example messages 2103 and 2105 in the Figure.

The attribute types used in the display are message types. Each message type may have many different kinds of messages, and each of these has a message number. It is the message numbers which serve as attribute values in disply 2101. The error log file is prepared for display in display apparatus 2101 by parsing it to determine what kind and type of message each line belongs to and then using the line's message type and message number as the line's attribute type and attribute value. It should be noted that in this application, the lines belonging to an attribute type do not include all of the lines in the file. The message types for which information about messages may be displayed in display 2101 are shown at 2109. Here, what is being displayed are messages of the event type. Each message number has a different color. Line representations for messages having one of 9 different event] message numbers (out of a total of 253 different event message numbers) are being displayed in display 2101.

Display 2101 shows chains of related messages from one log file taken from an eight hour software stability run. The first three columns are from the switch initialization. The real test starts at hour 00:00 and concludes at the end of hour 07:00. The interesting aspect of FIG. 21 involves the chains of related messages. The 5ESS switch is extraordinarily reliable with down time measured in minutes per year. This reliability is achieved by using fault tolerant techniques that enable the switch to recover gracefully from problems. The chains of related log messages show the system recovering from software errors. At the beginning of each chain the switch encounters a software error. As part of its recovery process the switch tries to correct the error by running its diagnostic routines, performing process error checking, checking its database for consistency, and finally by reinitializing the process encountering the error. At each step a message is appended to the log file. To eliminate the cascading messages, the root problem causing the original software error must be repaired.

The chains of error messages first appear during hour 03:00. (The earlier messages in hours 00:00 and 01:00 are unrelated.) This suggest that something in the test suite that started at 03:00 has stimulated this problem and provides a starting place for debugging.

There are two places where chains from different problems interlace as the switch is correcting multiple problems simultaneously. One occurs during hour 03:00 and the other occurs during hour 07:00.

Other Applications of the Information Display Apparatus

Though the applications described thus far are all related to programming, program testing, and program maintenance, the information display apparatus is by no means limited to such areas. For example, the apparatus might be usefully employed in an interactive television system. As the number of channels available in such a system increases, it becomes more and more difficult to display program information in a way which is useful to the user. The information display apparatus might be used to solve this problem as follows: each column 205 would correspond to a channel; each line representation 207 would represent a program; the line representations 207 would be ordered in the columns 205 by program time. A column might display the programs for a day, a week, or a longer time. Attribute types might be things like the kind of program, in which case the values would include "comedy", "drama", "football", "news", "film", and so on, the names of the performers or teams, subject matter of the programs, or suitability of the programs for various audiences.

The television viewer could use the display apparatus in the following fashion: First, he would select the attribute type of interest. Then, he would select the value of that type that was of interest from selector 1603; at that point, he could immediately see which of the programs having the attribute he was interested in could be seen at the times he was interested in. He could then use one or more code view windows 505 to obtain details of the programs. Conditional display would also be useful in such an application. For example, the user could look for all basketball games involving a given team or could look for all comedies suitable for family viewing. Selection of a specific program for viewing could be done using the mouse, or a number of selections could be made for recording by a VCR.

Depending on the capabilities of the interactive television system and the network to which it is attached, the display might be produced at a central location and provided to the television set, or the television set might receive the text and attribute fries necessary to make the display and generate the display locally.

Conclusion

The foregoing detailed description of a preferred embodiment has disclosed to one of ordinary skill in the art how certain display techniques may be implemented and used to retain the overall context of the body of information being investigated by the user while providing detailed information about individual entities in the body of information and providing individual access to selected ones of the entities. As is apparent from the detailed description, the techniques represent fundamental innovations. Many variations on the techniques and on the manner in which they are implemented are possible. For example, the preferred embodiment uses color to relate modification requests to lines; in other embodiments, color in the widest sense may be used, i.e., a gray scale or different kinds of shadings may be used instead of color. Further, any other change in appearance may be employed to distinguish line representations. Examples might be blinking line representations on and off, changing their shapes, or causing them to change their positions. Further, the columns of the preferred embodiment could be replaced by any arrangement which was useful to show an entity to which the entities represented by the line representations belonged. Further, techniques other than those used in the preferred embodiment can be used to control the information display apparatus. As regards implementation, mouse 103 could be replaced by any kind of pointing device, including cursor control keys and pen devices. The data structures described herein and their content will vary according to the kind of information being displayed, and the operation of the code viewer, too may depend on the kind of information being viewed.

As is also apparent from the foregoing discussion, the applications of the invention are not limited to those disclosed herein. The techniques of the invention may be employed in any context in which information must be made accessible to a user. While the techniques are particularly suited to situations in which there is a large body of information, techniques like conditional display, attachable and detachable code viewers, animation, and the linking of attribute values and display characteristics are useful with bodies of information of any size.

For all of these reasons, the implementation disclosed herein is to be regarded in all respects as merely illustrative and exemplary and the invention claimed herein is not defined by the disclosed implementation, but instead by the claims, which are to be interpreted as broadly as the law allows.

What is claimed is:

1. Apparatus implemented in a system having processing means and a display controlled by the processing means for displaying information about a plurality of entities comprising lines of one or more texts, the entities having associated attribute values and the apparatus comprising:

items in the display including context representation means (205) for visually representing a context of the entities;

for each entity, individual entity representation means (207) contained in the context representation means for visually representing the entity, a plurality of the entity representation means being simultaneously present in the display and each entity representation means having a size such that at least five thousand of the entity representation means may be simultaneously displayed in a display with a 19 inch diagonal measurement;

a plurality of individual value representation means distinct from the context representation means, (303) the individual value representation means being simultaneously present in the display and each one of the value representation means visually representing an attribute value; and pointing means (103) for selecting a displayed item in response to a user input to the system; and responding means in the processing means responsive to a first kind of selection of a value representation means by the pointing means by altering the appearance in the display of any entity representation means itself whose corresponding entity is associated with the value represented by the selected value representation means to a first appearance, the first appearance indicating selection of the entity representation means.

2. The apparatus set forth in claim 1 wherein:

the first appearance is associated with the value selected in the first selection.

3. The apparatus set forth in claim 2 wherein:

the responding means further alters the appearance of the value representation means selected in the first selection to a second appearance, the second appearance indicating selection.

4. The apparatus set forth in claim 3 wherein:

the first appearance and the second appearance are substantially the same.

5. The apparatus set forth in any of claims 3 through 4 wherein:

the first appearance and the second appearance are colors of the entity representative means and/or the value representation means.

6. The apparatus set forth in claim 5 wherein:

the colors are shades in a gray scale.

7. The apparatus set forth in claim 5 further comprising:

color changing means responsive to the pointing means for changing the relationship between a color and an attribute value.

8. The apparatus set forth in claim 7 wherein:

the pointing means selects a subset of the value representation means and the color changing means responds thereto by mapping the value representations belonging to the subset onto a range of colors.

9. The apparatus set forth in any of claims 3 through 4 wherein:

the responding means further responds to a kind of second selection of a value representation means by the pointing means by altering the appearance in the display of entity representation means whose corresponding entity is associated with the value represented by the selected value representation means to a third appearance, the third appearance indicating deselection.

10. The apparatus set forth in claim 9 wherein:

the responding means further alters the appearance of the value representation means selected in the second selection to a fourth appearance, the fourth appearance indicating deselection.

11. The apparatus set forth in claim 10 wherein:

the third appearance and the fourth appearance are substantially the same.

12. The apparatus set forth in claim 1 wherein:

the value representation means are arranged in the display in a non-random order which corresponds to a non-random order of the attribute values.

13. The apparatus set forth in claim 12 wherein the items further comprise:

selector means in which the value representation means are contained.

14. The apparatus set forth in claim 13 wherein:

the value representation means are arranged contiguously in the selector means.

15. The apparatus set forth in claim 13 wherein:

the selector means is bar-shaped.

16. The apparatus set forth in claim 1 wherein the items in the display further comprise:

detailed viewing means including entity representation specification means for visually specifying an entity representation; and detailed display means for displaying detailed information about at least the entity corresponding to the specified entity representation.

17. The apparatus set forth in claim 16 wherein:

the detailed display means displays at least the entity represented by the specified entity representation.

18. The apparatus set forth in claim 16 or 17 wherein:

there is a plurality of the detailed viewing means; and the apparatus further includes means for attaching one of the detailed viewing means to the pointing means such that the detailed viewing means displays detailed information about the entity representation currently specified by the pointing means.

19. The apparatus set forth in claim 18 wherein:

the apparatus further includes means for detaching the one detailed viewing means from the pointing means.

20. The apparatus set forth in claim 1 wherein:

the context representation means are bar-shaped.

21. The apparatus set forth in claim 20 wherein:

each entity representation means is a line one pixel in width.

22. The apparatus set forth in claim 21 wherein:

the length of the entity representation means in the first appearance represents a property of the entity.

23. The apparatus set forth in claim 22 wherein:

the entity is a line of text and the length of the entity representation means in the first appearance is proportional to the length of the line of text which the entity representation means represents.

24. The apparatus set forth in claim 1 wherein:

the shape of the entity representation means in the first appearance represents a property of the entity.

25. The apparatus set forth in claim 1 wherein:

the appearance of the value representation means indicates further information about the attribute value represented by the value representation means.

26. The apparatus set forth in claim 25 wherein:

each attribute value representation means has a fixed area which it may occupy and the amount of the fixed area occupied by the attribute value representation means indicates a relationship between the attribute value represented by the attribute value representation means and an attribute value represented by another attribute value representation means.

27. The apparatus set forth in claim 1 wherein:

the responding means further responds to a selection of an entity representation means by altering the appearance of the selected entity representation means to the first appearance and altering the appearance of the value representation means representing the value associated with the selected entity representation means to a second appearance indicating selection of the value representation means.

28. The apparatus set forth in claim 27 wherein:

the second appearance further indicates the value.

29. The apparatus set forth in claim 28 wherein:

the first appearance and the second appearance are substantially the same.

30. The apparatus set forth in claim 27 wherein:

the responding means further responds to the selection of the entity representation means by altering the appearance of other entity representation means when those entity representation means are associated with the same attribute value as the selected entity representation means to the first appearance.

31. The apparatus set forth in claim 1 wherein:

the texts are files containing error log messages; and the attribute values associated with the lines are values indicating the kind of error log message to which each line belongs.

32. The apparatus set forth in claim 31 wherein:

the context representation means represents periods of time; and the line representations appear in the context representation means for the period of time at which the error message to which the line belongs occurred.

33. Apparatus implemented in a system including processing means and a display controlled by the processing means for displaying information about a plurality of entities comprising lines of one or more texts, the entities having associated attribute values and the apparatus having items in a display, the apparatus comprising:

items in the display including context representation means (205) for visually representing a context of the entities;

for each individual entity, individual entity representation means (207) contained in the context representation means for visually representing the entity, a plurality of the entity representation means being simultaneously present in the display;

selector means (219) distinct from the context representation means which contains a plurality of individual value representation means, (303) each one of the value representation means visually representing an attribute value, the value representation means being simultaneously present in the display, and the value representation means being substantially contiguous to each other in the selector means and being ordered according to an order of the attribute values; and pointing means (103) for selecting a displayed item; in response to a user input to the system; and responding means in the processing means responsive to a selection of a value representation means by the pointing means by altering the appearance in the display of any entity representation means itself whose corresponding entity is associated with the value represented by the selected value representation means to an appearance indicating selection.

34. The apparatus set forth in claim 33 wherein:

the appearance of the value representation means indicates information about the attribute value represented by the value representation means.

35. The apparatus set forth in claim 34 wherein:

each attribute value representation means has a fixed area which it may occupy and the amount of the fixed area occupied by the attribute value representation means indicates a relationship between the attribute value represented by the attribute value representation means and an attribute value represented by another attribute value representation means.

36. The apparatus set forth in any of claims 33 through 35 wherein:

the selector means is bar-shaped and each value representation means is a section of the bar.

37. Apparatus implemented in a system including processing means and a display controlled by the processing means for displaying information about a plurality of entities comprising lines of one or more texts, the entities having associated attribute values and the apparatus comprising:

items in the display including context representation means (205) for visually representing a context of the entities;

for each individual entity, individual entity representation means (207) contained in the context representation means for visually representing the entity, a plurality of the entity representation means being simultaneously present in the display;

a plurality of individual value representation means which are simultaneously present in the display and distinguished from the context representation means, (303) each one of the value representation means visually representing an attribute value; and pointing means (103) for selecting a displayed item; and responding means in the processing means responsive to a selection of a value representation means by the pointing means by altering the appearance in the display of the selected value representation means and of entity representation means whose corresponding entities are associated with the value represented by the selected value representation means to a first appearance, the first appearance indicating selection and the value and responding to a selection of an entity representation means by altering the appearance of the selected entity representation means itself to the first appearance and altering the appearance of the value representation means itself to a second appearance, the second appearance indicating selection.

38. The apparatus set forth in claim 35 wherein:

the second appearance further indicates the value.

39. The apparatus set forth in claim 36 wherein:

the first appearance and the second appearance are substantially the same.

40. The apparatus set forth in claim 37 wherein:

the responding means further responds to the selection of the entity representation means by altering the appearance of every other entity representation means which is associated with the same attribute value as the selected entity representation means to the first appearance.

41. The apparatus set forth in any of claims 1, 33, or 37 wherein:

each attribute value belongs to one of a plurality of attribute types, the items in the display further comprise:

foreground attribute type selection means responsive to the pointing means for selecting one of the attribute types as a foreground attribute type; and the responding means further responds to the selection of the one attribute type by displaying value representation means as required for the one attribute type.

42. The apparatus set forth in claim 41 further comprising:

background attribute type selection means responsive to the pointing means for selecting at least one attribute type which is not presently selected as a foreground attribute type as a background attribute type;

and wherein:

the responding means further alters the appearance of an entity representation for an entity whose attribute value corresponds to the selected value representation means in response not only to the selection of the value representation means by the pointing means but also in response to the value associated with the represented entity in the background attribute type.

43. The apparatus set forth in any of claims 1, 33, or 37 further comprising:

animation means responsive to the pointing means for automatically selecting each of the value representation means in turn according to a predetermined order and wherein the responding means responds to selection of the value representation means by the animation means in the same fashion as to selection of the value representation means by the pointing means.

44. The apparatus set forth in claim 43 further comprising:

animation speed selecting means responsive to the pointing means for specifying a speed at which the animation means selects each of the value representation means in turn, and wherein the animation means responds to the animation speed selection means by automatically selecting each of the value representation means at the speed specified by the animation speed selection means.

45. The apparatus set forth in claim 43 wherein:

the animation means selects the value representation means according to a first mode in which the currently-selected value representation means is deselected before the next-selected value representation means is selected and a second mode in which the currently-selected value representation means remains selected when the next-selected value representation means is selected.

46. The apparatus set forth in any of claims 1, 33, or 37 wherein:

the context representation means represent the texts.

47. The apparatus set forth in claim 46 wherein:

the texts are files containing program source code.

48. The apparatus set forth in claim 47 wherein:

the attribute values associated with the lines are values from a code history data base associated with the source code.

49. The apparatus set forth in claim 47 wherein:

the attribute values associated with the lines are values indicating whether the lines were executed by a test.

50. The apparatus set forth in claim 47 wherein:

the attribute values associated with the lines are values indicating how many times the lines were executed by a test.

51. The apparatus set forth in any of claims 1, 33, or 37 wherein:

temporary selection of a value representation means or an entity representation means occurs when the pointing means touches the value representation means or the entity representation means and lasts as long as the pointing means touches the value representation means or the entity representation means.

52. The apparatus set forth in any of claims 1, 33, or 37 wherein:

permanent selection of a value representation means or an entity representation means occurs when the pointing means touches the value representation means or the entity representation means and the user indicates permanent selection and lasts until the user indicates the end of the permanent selection.

53. Information display apparatus implemented in a system including processing means and a display controlled by the processing means for making a graphical display on the display of information about a plurality of entities comprising lines of one or more texts, the information display apparatus comprising:

a plurality of distinct individual entity representations which are simultaneously present on the display, each entity representation corresponding to one of the entities;

value relating means which is an area on the display, the value relating means relating values belonging to a set of values of the information to a plurality of visual characteristics, the visual characteristics being simultaneously present in the value relating means and each visual characteristic being displayed in a distinct predetermined portion of the value relating means;

selecting means in the display for interactively selecting either an entity representation or a visual characteristic; and responding means in the processing means responsive to the selecting means for causing any entity representation for an entity having a value corresponding to a selected visual characteristic to be displayed with the visual characteristic in response to selection of the visual characteristic in the value relating means and causing the visual characteristic in the value relating means to be displayed in response to a selection of any entity representation for an entity having the value represented by the visual characteristic.

54. Apparatus for displaying information about a sequence of lines of text, some of which are indented from a margin, and for which modifications are indicated in Modification Requests, MRs, comprising:

a) a programmable digital computer and an associated visual display;

b) pointing means (103) effective to allow a user to select components contained within the display;

c) software means, running on the computer, effective to
i) show, on the display, about 5,000 graphical lines (207), each of which corresponds to one of said lines of text, such that
A) the graphical lines are stacked in columns (205), in an order corresponding to said sequence of the lines of text, and
B) amount of indentation of each graphical line within a column indicates amount of indentation of a corresponding line of text;
ii) show, on the display, a plurality of MRs, of different shades of color; and
iii) cause predetermined graphical lines to assume the color of an MR, when that MR is selected by the pointing device.

55. Apparatus according to claim 54, and further comprising:

d) means for identifying authors of lines of text, when corresponding graphical lines are selected by the pointing device.

56. Apparatus according to claim 55, and further comprising:

e) means for identifying dates of creation of selected lines of text, when corresponding graphical lines are selected by the pointing device.

\* \* \* \* \*